US012676161B2

(12) United States Patent
Samal et al.

(10) Patent No.: US 12,676,161 B2
(45) Date of Patent: Jul. 7, 2026

(54) METHOD AND ELECTRONIC DEVICE FOR HANDLING SOUND SOURCE IN MEDIA

(71) Applicant: SAMSUNG ELECTRONICS CO., LTD., Suwon-si (KR)

(72) Inventors: Ranjan Kumar Samal, Bengaluru (IN); Praveen Kumar Guvvakallu Sivamoorthy, Bengaluru (IN); Biju Mathew Neyyan, Bengaluru (IN); Somesh Nanda, Bengaluru (IN); Arshed V Hakeem, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 18/734,468

(22) Filed: Jun. 5, 2024

(65) Prior Publication Data

US 2024/0321287 A1 Sep. 26, 2024

Related U.S. Application Data

(63) Continuation of application No. PCT/KR2024/003269, filed on Mar. 14, 2024.

(30) Foreign Application Priority Data

Mar. 14, 2023 (IN) ............................. 202341016964
Feb. 29, 2024 (IN) ............................. 202341016964

(51) Int. Cl.
*G10L 21/0208* (2013.01)

(52) U.S. Cl.
CPC ................................ *G10L 21/0208* (2013.01)

(58) Field of Classification Search
USPC ..................................... 704/228, 226, 1–504
See application file for complete search history.

(56) References Cited

U.S. PATENT DOCUMENTS 8,639,516 B2 1/2014 Lindahl et al.
9,799,330 B2 10/2017 Nemala et al.
(Continued)

FOREIGN PATENT DOCUMENTS

KR 10-1421793 7/2014
KR 10-2021-0048272 5/2021
(Continued)

OTHER PUBLICATIONS

Search Report and Written Opinion dated Jun. 17, 2024 issued in International Patent Application No. PCT/KR2024/003269.
(Continued)

*Primary Examiner* — Marcus T Riley
(74) *Attorney, Agent, or Firm* — Nixon & Vanderhye, P.C.

(57) ABSTRACT

Embodiments herein disclose methods for handling a sound source in a media by an electronic device. The method includes: determining and classifying a relevant sound source in a media as a primary sound source, a secondary sound source, and a non-subject sound source based on a determined context; generating an output sound by suppressing at least one of the secondary sound source and the non-subject sound source in the media and optimizing the primary sound source in the media using a data driven model based on the determination and classification; or generating the output sound by partially suppressing at least one of the secondary sound source and the non-subject sound source in the media and optimizing the primary sound source in the media using the data driven model based on the determination and classification.

15 Claims, 25 Drawing Sheets

(56) References Cited

U.S. PATENT DOCUMENTS

| | | | | |
|---|---|---|---|---|
| 9,838,784 | B2 | 12/2017 | Vallabhan et al. | |
| 10,186,276 | B2 | 1/2019 | Dewasurendra et al. | |
| 10,332,315 | B2 * | 6/2019 | Samec | G16H 40/63 |
| 10,475,465 | B2 | 11/2019 | Peleg et al. | |
| 10,592,199 | B2 * | 3/2020 | Rakshit | G11B 27/102 |
| 11,456,004 | B2 | 9/2022 | Younessian | |
| 11,462,210 | B2 * | 10/2022 | Ha | G10L 25/51 |
| 11,756,570 | B2 * | 9/2023 | Tzinis | G10L 25/57 381/56 |
| 11,825,278 | B2 | 11/2023 | Chae | |
| 12,482,197 | B2 * | 11/2025 | Samec | A61B 5/4094 |
| 2015/0092081 | A1 | 4/2015 | Lee et al. | |
| 2017/0199934 | A1 | 7/2017 | Nongpiur et al. | |
| 2017/0365101 | A1 * | 12/2017 | Samec | A61B 5/163 |
| 2019/0005976 | A1 | 1/2019 | Peleg et al. | |
| 2019/0287309 | A1 * | 9/2019 | Samec | G16H 40/63 |
| 2020/0035225 | A1 * | 1/2020 | Ha | G06N 3/08 |
| 2020/0312038 | A1 * | 10/2020 | Samec | G16H 40/63 |
| 2021/0124929 | A1 | 4/2021 | Chae | |
| 2021/0320636 | A1 * | 10/2021 | Matsukawa | H03G 3/02 |
| 2021/0398357 | A1 * | 12/2021 | Samec | A61B 5/4088 |
| 2022/0028406 | A1 | 1/2022 | Burmistrov et al. | |
| 2022/0159403 | A1 | 5/2022 | Sporer et al. | |
| 2023/0343045 | A1 * | 10/2023 | Samec | G16H 50/20 |
| 2024/0321287 | A1 * | 9/2024 | Samal | G10L 21/0208 |

FOREIGN PATENT DOCUMENTS

| | | | | |
|---|---|---|---|---|
| KR | 10-2273267 | | 7/2021 | |
| KR | 10-2022-0036210 | | 3/2022 | |
| KR | 10-2446694 | | 9/2022 | |
| WO | WO-2017222997 | A1 * | 12/2017 | A61B 3/09 |
| WO | 2022059869 | A1 | 3/2022 | |
| WO | WO-2024191212 | A1 * | 9/2024 | G10L 21/0208 |

OTHER PUBLICATIONS

Indian Examination Report issued Nov. 14, 2025 in corresponding Indian Patent Application No. 202341016964.

Extended European Search Report dated Mar. 16, 2026 issued in European Patent Application No. 24771211.0.

* cited by examiner

| Sound Sources | VN Mixer |
|---|---|
| Background Music | 80% |
| Dog Howling | 0% |
| Guitar | 10% |
| Speech | 5% |
| Human Clap & Laugh | 5% |
| Fire Alarm | 0% |

METHOD AND ELECTRONIC DEVICE FOR HANDLING SOUND SOURCE IN MEDIA

CROSS-REFERENCE TO RELATED APPLICATIONS

This application is a continuation of International Application No. PCT/KR2024/003269 designating the United States, filed on Mar. 14, 2024, in the Korean Intellectual Property Receiving Office and claiming priority to Indian Provisional Patent Application No. 202341016964, filed on Mar. 14, 2023, and to Indian Complete Patent Application Ser. No. 202341016964, filed on Feb. 29, 2024, in the Indian Patent Office, the disclosures of each of which are incorporated by reference herein in their entireties.

BACKGROUND

Field

The disclosure relates to content processing (e.g., audio processing, video processing or the like), and for example, to a method and an electronic device for handling acoustic sound sources in audio signals (e.g., suppressing acoustic sound sources in the audio signals, modifying acoustic sound sources in the audio signals, optimizing the acoustic sound sources in the audio signals or the like).

Description of Related Art

A sound recording can include ambient/background noises, especially when the sound recording is done in a noisy environment (such as, party, sports events, school function, college function or the like). The recorded audio signals (or recorded sound signals) often carry environment sounds along with an intended sound source. For example, audio conversation recorded in a restaurant will contain ambient music, speech, and crowd babble noise.

Consider an example scenario, where a user has thrown a house party for close friends. In the party, there are many things happening around such as background music, barking dogs, noisy guests, etc. The user navigates through the party to record his friends and pets. However, the sound recording contains all the background noise, which adversely affects the quality of the sound recording.

In existing methods and systems, noise suppression aims at reducing the unwanted sound(s) from the recorded audio signal. Often, noise suppression schemes can be either a Digital signal processing (DSP) based or Deep Neural Network (DNN) model based scheme. The DSP based schemes are light weight low latency and trained for few noise types elimination. The DNN model based schemes are powerful in eliminating variety of noise types and relatively larger in size and need more computational resources.

Current noise suppression solutions have no intelligence to decide on the noise proportion of each sound sources present in the audio signal. In an example scenario, consider that a group of friends are celebrating a birthday party at a home, wherein a video recording of the party is being made. During the celebrations, there was music being played, friends chatter, and laughter. Suddenly the home fire alarm just went off due to some circuit malfunction. The alarm sound was captured in the video. The current recording systems are not intelligent enough to diminish the alarm sound when the event being captured in the video is a birthday party.

Further, often the sound source changes while the recording is in progress. Due to this, the sound intensity from the source decreases whereas the environmental noise remains constant as it was before rotation.

The above information is presented as background information only to help the reader to understand the disclosure. No determination or assertion as to whether any of the above might be applicable as prior art with regard to the present application is made.

SUMMARY

Embodiments of the disclosure may provide methods and systems (e.g., electronic device or the like) to contextually suppress acoustic sound sources in audio signals, where the context in which media (which comprises audio signals and visual information) was captured is detected with the sound types, the irrelevant sound sources are identified, and the irrelevant sound sources are suppressed.

Embodiments of the disclosure may provide systems and methods to determine the relevant sound sources as primary subject, secondary subject, and/or non-subject sound sources, based on the relevancy of sound set by the user from several intelligent data driven modes (e.g., AI modes or the like), and automatically determines to either partially or completely suppress the non-subject sound sources.

Embodiments of the disclosure may provide systems and methods to choose to partially or completely eliminate secondary sound sources, based on a correlation between the primary sound sources and secondary sound sources.

Embodiments of the disclosure may provide systems and methods to determine the orientation and movement of subject (e.g., human or the like) in visual scene and position of a recording microphone to adaptively tune the subject sound source.

Embodiments of the disclosure may provide systems and methods that use predefined AI modes to regulate the proportionate mixing of the primary sound sources, the secondary sound sources, the non-subject sound sources, and irrelevant sound sources based on context.

Embodiments of the disclosure may provide systems and methods to predefine the AI modes to automatically tune the audio content based on relevance to the context situation, capability of a target device to be played on, and users hearing profile.

Embodiments of the disclosure may provide systems and methods to provide that the AI modes automatically tunes the primary subject sound sources, the secondary subject sound sources, the non-subject sound sources, and the irrelevant subject sound sources based on target device capabilities, the user hearing profile, user's intention to play the video/audio, and contextual situation while the signals were recorded.

Accordingly, various example embodiments herein provide methods for handling a sound source in a media (including audio signals and visual information). The method includes: determining, by an electronic device, a context in which the media is captured; determining and classifying, by the electronic device, a relevant sound source in the media as a primary sound source, a secondary sound source, and a non-subject sound source based on the determined context; and generating an output sound by suppressing at least one of the secondary sound source and the non-subject sound source in the media and optimizing the primary sound source in the media using a data driven model based on the determination and classification.

In an example embodiment, the method includes: generating the output sound by partially suppressing at least one of the secondary sound source and the non-subject sound source in the media and optimizing the primary sound source in the media using the data driven model based on the determination and classification.

In an example embodiment, the method includes: generating the output sound by automatically adjusting at least one of the primary sound source, the secondary sound source, and the non-subject sound source using the data driven model based on the determination and classification.

In an example embodiment, the method includes: detecting, by the electronic device, at least one event, wherein the at least one event includes at least one of: a change in a sound source parameter associated the media, a change in correlation between a visual subject associated with the media in focus to the sound source occurring at a specified interval, a change in correlation between the primary sound source and the secondary sound source in the media at a specified interval, a change in an orientation and movement of a subject in a visual scene and position of a recording media associated with the media. The method may further include: determining, by the electronic device, the context of the media based on the at least one detected event; determining, by the electronic device, a second relevant sound source in the media as a second primary sound source, a second secondary sound source, and a second non-subject sound source based on the determined context; generating a second output sound by completely suppressing at least one of the second secondary sound source and the second non-subject sound source in the media and optimizing the second primary sound source in the media using the data driven model based on the determination and classification.

In an example embodiment, the method includes generating a second output sound by partially suppressing at least one of the second secondary sound source and the second non-subject sound source in the media and optimizing the second primary sound source in the media using the data driven model based on the determination and classification.

In an example embodiment, the method includes generating a second output sound by automatically adjusting at least one of the second primary sound source, the second secondary sound source, and the second non-subject sound source using the data driven model based on the determination and classification.

In an example embodiment, completely suppressing at least one of the secondary sound source and the non-subject sound source in the media includes determining a correlation between the primary sound source and at least one of the secondary sound source and the non-subject sound source, and completely suppressing at least one of the secondary sound source and the non-subject sound source in the media based on the determined correlation.

In an example embodiment, completely suppressing at least one of the secondary sound source and the non-subject sound source in the media includes identifying at least one of the secondary sound source and the non-subject sound source in the media as irrelevant sound source, and completely suppressing at least one of the secondary sound source and the non-subject sound source in the media based on identifying at least one of the secondary sound source and the non-subject sound source in the media as irrelevant sound source.

In an example embodiment, partially suppressing at least one of the secondary sound source and the non-subject sound source in the media includes determining a correlation between the primary sound source and at least one of the secondary sound source and the non-subject sound source, and partially suppressing at least one of the secondary sound source and the non-subject sound source in the media based on the determined correlation.

In an example embodiment, determining and categorizing, by the electronic device, the relevant sound source in the media as the primary sound source, the secondary sound source, and the non-subject sound source includes obtaining, by the electronic device, at least one of an environmental context, a scene classification information, a device context, and a hearing profile, and determining, by the electronic device, the relevant sound source in the media as the primary sound source, the secondary sound source, and the non-subject sound source based on at least one of the environmental context, the scene classification information, the device context, and the hearing profile.

In an example embodiment, the method includes selectively monitoring, by the electronic device, each relevant sound source based on at least one of the environmental context, the scene classification information, and the device context.

In an example embodiment, generating the output sound source by automatically adjusting at least one of the primary sound source, the secondary sound source, and the non-subject sound source using the data driven model includes determining a relative orientation of a recording media and the primary sound source, adjusting a proportion of the secondary sound source and a proportion of the non-subject sound source upon determining a relative orientation of the recording media and the primary sound source, and generating the output sound source by adjusting relative orientation of the recording media and the primary sound source, the proportion of the secondary sound source, and the proportion of the non-subject sound source.

Accordingly, example embodiments herein provide methods for handling a sound source in a media. The method includes: identifying, by an electronic device, at least one subject that is source of sound in each scene in a media; identifying, by the electronic device, at least one of a context of each scene, a context of the electronic device from which the media is captured and a context of an environment of the scene; classifying, by the electronic device, each subject in each scene as at least one of: a primary subject and at least one non-primary subject based on the identification; determining, by the electronic device, a relationship between the primary subject and the at least one non-primary subject in each scene based on the classification; and combining, by the electronic device, a sound from the primary subject and the non-primary subject in specified proportion in response to the determined relationship between the primary subject and the at least one non-primary subject.

In an example embodiment, the method includes partially or completely eliminating, by the electronic device, the sound from the at least one non-primary subject upon determining the relationship between the primary subject and the at least one non-primary subject.

In an example embodiment, the method includes: determining, by the electronic device, a relevancy of the at least one non-primary subject with respect to the context based on a data driven model; and partially or completely suppressing, by the electronic device, the sound from the at least one non-primary subjects based on the determination.

In an example embodiment, the method includes: identifying, by the electronic device, the at least one non-primary subject as irrelevant sound source; and completely suppressing, by the electronic device, the sound from the at least one non-primary subject.

In an example embodiment, the method includes determining, by the electronic device, at least one of an orientation and a movement of the subject in each scene and position of a recording media to adaptively tune the sound from the subject in the scene.

Accordingly, example embodiments herein provide an electronic device including a sound source controller coupled with at least one processor, comprising processing circuitry, and a memory. The sound source controller is configured to: determine a context in which a media is captured; determine and classify a relevant sound source in the media as a primary sound source, a secondary sound source, and a non-subject sound source based on the determined context; generate an output sound by completely suppressing at least one of the secondary sound source and the non-subject sound source in the media and optimizing the primary sound source in the media using a data driven model based on the determination and classification.

In an example embodiment, the sound source controller is configured to generate the output sound by partially suppressing at least one of the secondary sound source and the non-subject sound source in the media and optimizing the primary sound source in the media using the data driven model based on the determination and classification.

In an example embodiment, the sound source controller is configured to generate the output sound by automatically adjusting at least one of the primary sound source, the secondary sound source, and the non-subject sound source using the data driven model based on the determination and classification.

Accordingly, example embodiments herein provide an electronic device including a sound source controller coupled with at least one processor, comprising processing circuitry, and a memory. The sound source controller is configured to: identify at least one subject that is a source of sound in each scene in a media; identify at least one of a context of each scene, a context of the electronic device from which the media is captured and a context of an environment of the scene; classify each subject in each scene as at least one of: a primary subject and at least one non-primary subject based on the identification; determine a relationship between the primary subject and the at least one non-primary subject in each scene based on the classification; and combine a sound from the primary subject and the non-primary subject in specified proportion in response to the determined relationship between the primary subject and the at least one non-primary subject.

These and other aspects of various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the spirit thereof.

BRIEF DESCRIPTION OF THE DRAWINGS

Various example embodiments disclosed herein are illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1:
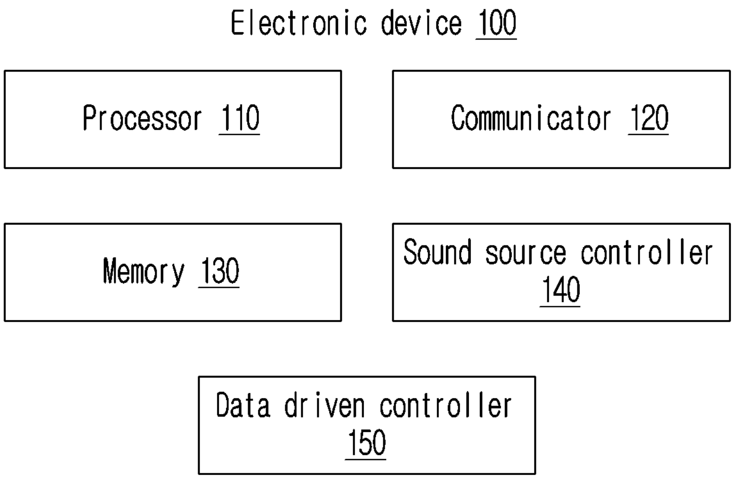
FIG. 1 is a block diagram illustrating an example configuration of an electronic device, according to various embodiments.

The various example embodiments herein and the various features and advantageous details thereof are explained more fully with reference to the various non-limiting example embodiments that are illustrated in the accompanying drawings and detailed in the following description. Descriptions of well-known components and processing techniques may be omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the disclosure.

For the purposes of interpreting this disclosure, the definitions (as defined herein) will apply and whenever appropriate the terms used in singular will also include the plural and vice versa. It is to be understood that the terminology used herein is for the purposes of describing various embodiments only and is not intended to be limiting. The terms “comprising”, “having” and “including” are to be construed as open-ended terms unless otherwise noted.

The words/phrases “exemplary”, “example”, “illustration”, “in an instance”, “and the like”, “and so on”, “etc.”, “etcetera”, “e.g.,”, “i.e.,” are merely used herein to refer, for example, to “serving as an example, instance, or illustration.” Any embodiment or implementation of the present subject matter described herein using the words/phrases “exemplary”, “example”, “illustration”, “in an instance”, “and the like”, “and so on”, “etc.”, “etcetera”, “e.g.,”, “i.e.,” is not necessarily to be construed as preferred or advantageous over other embodiments.

Embodiments herein may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

It should be noted that elements in the drawings are illustrated for the purposes of this description and ease of understanding and may not have necessarily been drawn to scale. For example, the flowcharts/sequence diagrams illustrate the method in terms of the steps required for understanding of aspects of the embodiments as disclosed herein. Furthermore, in terms of the construction of the device, one or more components of the device may have been represented in the drawings by conventional symbols, and the drawings may show only those specific details that are pertinent to understanding the present embodiments so as not to obscure the drawings with details that will be readily apparent to those of ordinary skill in the art having the benefit of the description herein. Furthermore, in terms of the system, one or more components/modules which comprise the system may have been represented in the drawings by conventional symbols, and the drawings may show only those specific details that are pertinent to understanding the various example embodiments so as not to obscure the drawings with details that will be readily apparent to those of ordinary skill in the art having the benefit of the description herein.

The accompanying drawings are used to help easily understand various technical features and it should be understood that the embodiments presented herein are not limited by the accompanying drawings. As such, the present disclosure should be construed to extend to any modifications, equivalents, and substitutes in addition to those which are particularly set out in the accompanying drawings and the corresponding description. Usage of words such as first, second, third etc., to describe components/elements/steps is for the purposes of this description and should not be construed as sequential ordering/placement/occurrence unless specified otherwise.

The terms “audio” and “sound” are used interchangeably in the patent disclosure.

The embodiments herein describe various example methods for handling a sound source in a media (including audio signals and visual information). The method includes determining, by an electronic device, a context in which the media is captured. Further, the method includes determining and classifying, by the electronic device, a relevant sound source in the media as a primary sound source, a secondary sound source, and a non-subject sound source based on the determined context. In an embodiment, the method includes generating an output sound by suppressing at least one of the secondary sound source and the non-subject sound source in the media and optimizing the primary sound source in the media using a data driven model based on the determination and classification. In an embodiment, the method includes generating the output sound by partially suppressing at least one of the secondary sound source and the non-subject sound source in the media and optimizing the primary sound source in the media using the data driven model based on the determination and classification. In an embodiment, the method includes generating the output sound by automatically adjusting at least one of the primary sound source, the secondary sound source, and the non-subject sound source using the data driven model based on the determination and classification.

The disclosed method can be used to contextually suppress the acoustic sound sources in the audio signals, so as to improve the user experience. In an example, the user has thrown a house party to close friends. In his party, there are many things happening around such as background music, pet dog howling, guests clapping, laughing, giggling, etc. The user navigates through the party to record his friends and pets. Based on the disclosed method, the smart phone including a video camera helps in prioritizing the sound sources based on the visual focus context. The generated video will contain audio sounds relevant to the visual scene. Thus, results in improving the user experience.

The disclosed method uses the environmental context, scene classification, and device context to selectively focus on each of the relevant sound sources. Further, the disclosed method categorizes the sound sources into the primary sound sources, the secondary sound sources, the non-subject sound sources, and irrelevant sound sources based on the environment context, the device context and the scene context. The disclosed method expresses on how the acoustic parameters of the sound sources changed. The disclosed method generates the different acoustic signals with various combination of the sound sources in different contexts.

The disclosed method uses pre-defined (e.g., specified) data driven model (e.g., AI modes, ML modes or the like) to automatically adjust the sound source proportionate mixing. The disclosed method determines the relative orientation of the mic and the primary sound source, and uses the same to adjust the other sound source proportion to generate acoustic signal similar to ideal situation. The disclosed method uses the device context information to determine what is voice and what is noise for the same video recording in different context.

The disclosed method can be used to mixes the noise content at different levels intelligently to retain the naturalness of the video while minimizing or reducing user effort or simplifying the recording/editing time for the user.

Based on the disclosed method, the electronic device correlates the context in which video is captured with the sound types captured as part of the recordings. From the correlation, the electronic device determines irrelevant sound sources and completely suppresses them. The electronic device further establishes correlation between the visual subjects in focus to the sound sources occurring in the time point. The electronic device categorizes the relevant sound sources as primary subject, secondary subject, and/or non-subject sound sources. Further, based on the modes set by the user from several intelligent AI modes or ML modes, the electronic device automatically determines to either partially or completely suppress the non-subject sound sources. The electronic device further uses the visual and audio information to establish correlation between the primary and secondary sound sources. Based on the correlation, the electronic device chooses to partially or completely eliminate the secondary sound sources. Further, the electronic device also determines the orientation and movement of subject in visual scene and position of the recording microphone to adaptively tunes the subject sound source parameters to have constant volume level from the source.

Referring now to the drawings, and more particularly to FIGS. 1 through 14, where similar reference characters denote corresponding features consistently throughout the figures, there are shown various example embodiments.

FIG. 1 is a block diagram illustrating an example configuration of the electronic device (100), according to various embodiments. The electronic device (100) can be, for example, but not limited to a laptop, a smart phone, a desktop computer, a notebook, a Device-to-Device (D2D) device, a vehicle to everything (V2X) device, a foldable phone, a smart TV, a tablet, an immersive device, a virtual reality (VR) device, a mixed reality device, an augmented reality device, a virtual headset, and an internet of things (IoT) device.

In an embodiment, the electronic device (100) includes a processor (e.g., including processing circuitry) (110), a communicator (e.g., including communication circuitry) (120), a memory (130), a sound source controller (e.g., including various circuitry) (140) and a data driven controller (e.g., including various circuitry) (150). The processor (110) is coupled with the communicator (120), the memory (130), the sound source controller (140) and the data driven controller (150).

The sound source controller (140) determines a context in which a media is captured. The media includes audio signals and visual information. The media can be, for example, but not limited to a video, a multimedia content, an animation, shorts or the like. Further, the sound source controller (140) determines and classifies a relevant sound source in the media as a primary sound source, a secondary sound source, and a non-subject sound source based on the determined context. For an example, in the music events, the primary sound source can be an ambient music, the secondary sound source can be the guitar sound, and the non-subject sound source can be the dog howling and laughing sound. In an embodiment, the sound source controller (140) obtains an environmental context (e.g., weather context, location context or the like), a scene classification information, a device context (e.g., CPU usage context, application usage context or the like), and a hearing profile. Based on the environmental context, the scene classification information, the device context, and the hearing profile, the sound source controller (140) determines the relevant sound source in the media as the primary sound source, the secondary sound source, and the non-subject sound source.

In an embodiment, based on the determination and classification, the sound source controller (140) generates an output sound by suppressing at least one of the secondary sound source and the non-subject sound source in the media and optimizing the primary sound source in the media using a data driven model (e.g., AI model, ML model or the like).

In an embodiment, the sound source controller (140) generates the output sound by partially suppressing at least one of the secondary sound source and the non-subject sound source in the media and optimizing the primary sound source in the media using the data driven model based on the determination and classification.

In an embodiment, at least one of the secondary sound source and the non-subject sound source in the media are completely suppressed by determining a correlation between the primary sound source and at least one of the secondary sound source and the non-subject sound source, and completely suppressing at least one of the secondary sound source and the non-subject sound source in the media based on the determined correlation.

In an embodiment, at least one of the secondary sound source and the non-subject sound source in the media is completely suppressed by identifying at least one of the secondary sound source and the non-subject sound source in the media as irrelevant sound source, and completely suppressing at least one of the secondary sound source and the non-subject sound source in the media based on the identification.

In an embodiment, at least one of the secondary sound source and the non-subject sound source in the media is partially suppressed by determining the correlation between the primary sound source and at least one of the secondary sound source and the non-subject sound source, and partially suppressing at least one of the secondary sound source and the non-subject sound source in the media based on the determined correlation.

In an embodiment, the sound source controller (140) generates the output sound by automatically adjusting at least one of the primary sound source, the secondary sound source, and the non-subject sound source using the data driven model based on the determination and classification. In an embodiment, the sound source controller (140) determines a relative orientation of a recording media (e.g., speaker, mic, or the like) and the primary sound source. Further, the sound source controller (140) may adjust a proportion of the secondary sound source and a proportion of the non-subject sound source upon determining a relative orientation of the recording media and the primary sound source. Further, the sound source controller (140) generates the output sound source by adjusting relative orientation of the recording media and the primary sound source, the proportion of the secondary sound source, and the proportion of the non-subject sound source.

Further, the sound source controller (140) detects an event. The event can be, for example, but not limited to a change in a sound source parameter associated the media, a change in correlation between a visual subject associated with the media in focus to the sound source occurring at a specified interval, a change in correlation between the primary sound source and the secondary sound source in the media at a specified interval, a change in an orientation and movement of a subject (e.g., targeted human, or the like) in a visual scene and position of a recording media associated with the media.

Further, the sound source controller (140) determines the context of the media based on the detected event. Further, the sound source controller (140) determines a second relevant sound source in the media as a second primary sound source, a second secondary sound source, and a second non-subject sound source based on the determined context.

In an embodiment, the sound source controller (140) generates a second output sound by completely suppressing at least one of the second secondary sound source and the second non-subject sound source in the media and optimizing the second primary sound source in the media using the data driven model based on the determination and classification.

In an embodiment, the sound source controller (140) generates the second output sound by partially suppressing at least one of the second secondary sound source and the second non-subject sound source in the media and optimizing the second primary sound source in the media using the data driven model based on the determination and classification. In an embodiment, the sound source controller (140) generates the second output sound by automatically adjusting at least one of the second primary sound source, the second secondary sound source, and the second non-subject sound source using the data driven model based on the determination and classification.

Further, the sound source controller (140) selectively monitors on each of the relevant sound source based on at least one of the environmental context, the scene classification information, and the device context.

In an embodiment, the sound source controller (140) identifies at least one subject that is source of sound in each scene in the media. Further, the sound source controller (140) identifies at least one of the context of each scene, the context of the electronic device (100) from which the media is captured and the context of the environment of the scene. Further, the sound source controller (140) classifies each subject in each scene as at least one of: the primary subject and at least one non-primary subject based on the identification. Further, the sound source controller (140) determines the relationship between the primary subject and the at least one non-primary subject in each scene based on the classification. Further, the sound source controller (140) combines the sound from the primary subject and the non-primary subject in pre-defined proportion in response to the determined relationship between the primary subject and the non-primary subject.

In an embodiment, the sound source controller (140) partially or completely eliminates the sound from the non-primary subject upon determining the relationship between the primary subject and the non-primary subject. In an embodiment, the sound source controller (140) determines the relevancy of the non-primary subject with respect to the context based on the data driven model. Further, the sound source controller (140) partially or completely suppresses the sound from the non-primary subjects based on the determination.

In an embodiment, the sound source controller (140) identifies the non-primary subject as irrelevant sound source. Further, the sound source controller (140) completely suppresses the sound from the non-primary subject. In an embodiment, the sound source controller (140) determines at least one of an orientation and a movement of the subject in each scene and position of a recording media to adaptively tune the sound from the subject in the scene.

The sound source controller (140) may, for example, be implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (110) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (110) may include multiple cores and is configured to execute the instructions stored in the memory (130). The processor 110 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

Further, the processor (110) is configured to execute instructions stored in the memory (130) and to perform various processes. The communicator (120) may include various communication circuitry and is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

In an embodiment, the communicator (120) may include an electronic circuit specific to a standard that enables wired or wireless communication. The communicator (120) is configured to communicate internally between internal hardware components of the electronic device (100) and with external devices via one or more networks.

Further, at least one of the pluralities of modules/controller may be implemented through an Artificial intelligence (AI) model using the data driven controller (150). The data driven controller (150) can be a machine learning (ML) model based controller and AI model based controller. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning may refer, for example, to a predefined operating rule or AI model of a desired characteristic being made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm may refer, for example, to a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 1 shows various hardware components of the electronic device (100) it is to be understood that disclosure is not limited thereto. In various embodiments, the electronic device (100) may include less or more number of components. Further, the labels or names of the components are used only for illustrative purpose and does not limit the scope of the disclosure. One or more components can be combined together to perform same or substantially similar function in the electronic device (100).

Figure 2:
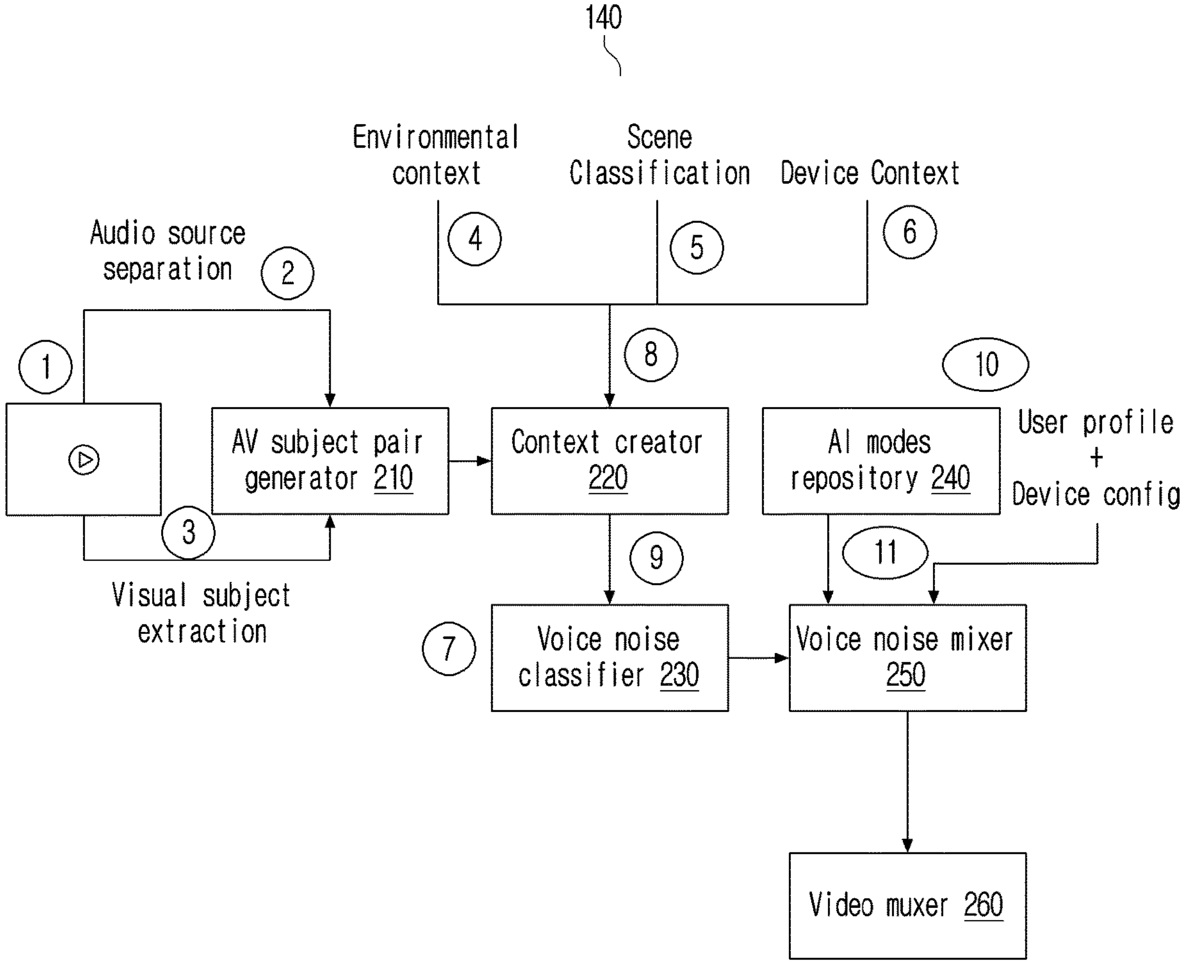
FIG. 2 is diagram illustrating an example environment in which various hardware components of a sound source controller included in the electronic device is depicted, according to various embodiments.

FIG. 2 is a diagram illustrating an example environment in which various hardware components of the sound source controller (140) included in the electronic device (100) are depicted, according to various embodiments.

In step 1, the video is provided, wherein the video can be pre-recorded or is being recorded in real-time. In step 2, all the sound sources present in the audio stream for a given time span are separated. In step 3, the visual subjects within the given time frame are extracted. In step 4, the environment information/context while the video was recorded or from the video scene is determined. In step 5, the information about the visual and acoustic scene generated from the video is determined. In step 6, the information from the device application on which the video is being processed is gathered. In step 7, the relation information about the visual and acoustic subjects are carried and the relation is generated. Embodiments herein disclose an audio visual (AV) subject pair generator (210), wherein the AV subject pair generator (210) can correlate one or more visual subjects with one or more acoustic subjects. The operations of the AV subject pair generator (210) is explained in FIG. 3. In step 8, based on the device context for the video, a weight is assigned to context elements by the context creator (220). The weight is set by the electronic device (100) or the user of the electronic device (100). The operations of the context creator (220) is explained in FIG. 4. In step 9, a Voice Noise (VN) classifier (230) uses the device context information to categorize each of the context elements to be the primary subjects, the secondary subjects, the non-subject subjects, and the irrelevant subjects. In an embodiment, the VN classifier (230) can categorize the acoustic sound sources to be the primary subjects, the secondary subjects, the non-subject subjects and the irrelevant subjects using information received from the AV subject pair generator (210) along with the context information. The operations of the voice noise classifier (230) is explained in FIG. 6. In step 10, pre-defined AI modes are provided, wherein a selection can be made from the AI modes repository (240), and the selected AI mode helps a VN estimator (not shown) to classify what is voice and what is noise. In step 11, based on the AI modes, the VN mixer (250) proportionately mixes the voice and noise sound sources. The VN mixer (250) can also suitably adjust the intensity of the primary subject source, while keeping all other subject sources intensities at a constant level. The operations of the voice noise mixer (250) is explained in greater detail below with reference to FIG. 7. Further, the VN mixer (250) proportionately mixes the voice and noise sound sources, which is then provided to the video multiplexer (mixer) (260)).

Although FIG. 2 shows various hardware components of the sound source controller (140) it should be understood that the disclosure is not limited thereto. In various embodiments, the sound source controller (140) may include less or more number of components. Further, the labels or names of the components are used only for illustrative purpose and does not limit the scope of the disclosure. One or more components can be combined together to perform same or substantially similar function in the sound source controller (140).

Figure 3:
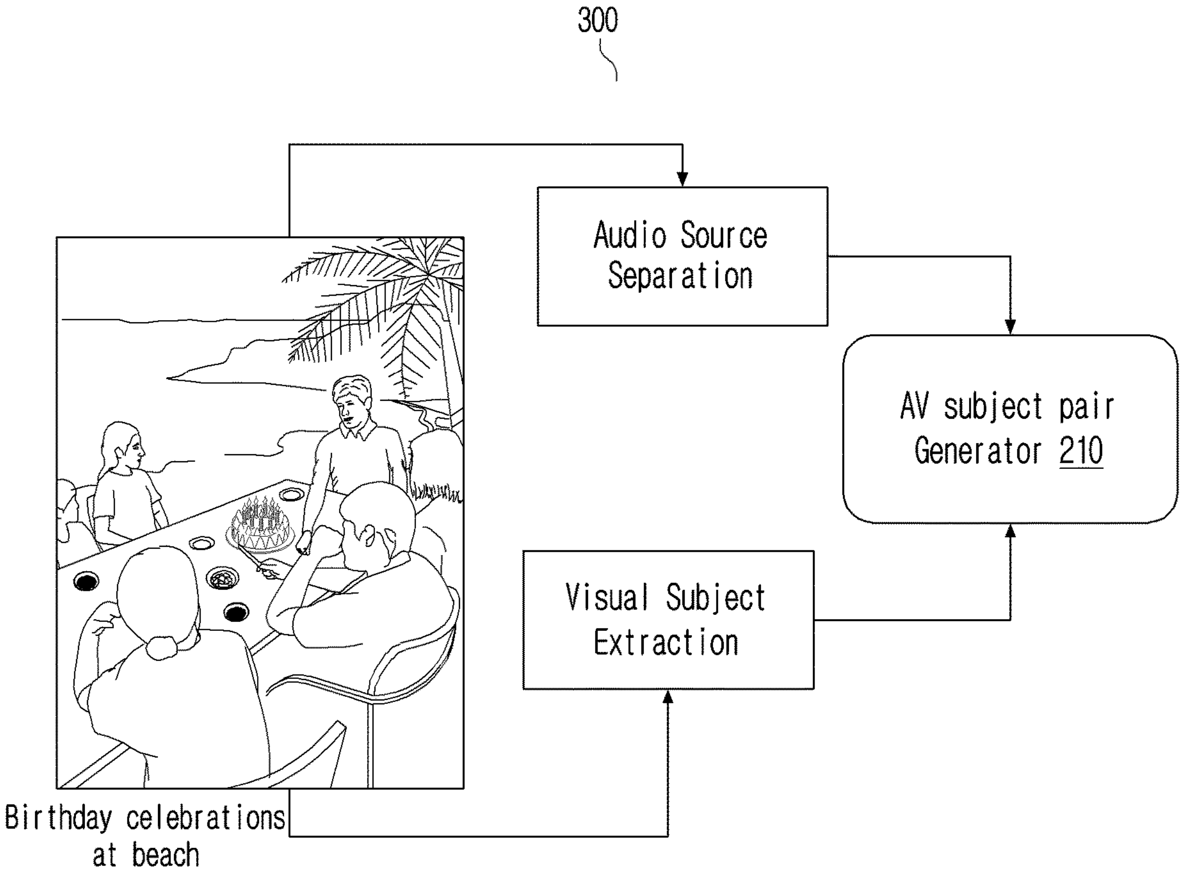
FIG. 3 is a diagram illustrating an example scenario in which operations of an audio video (AV) subject pair generator included in the sound source controller is explained, according to various embodiments.

FIG. 3 is a diagram illustrating an example scenario (300) in which operations of the AV subject pair generator (210) included in the sound source controller (140) is explained, according to various embodiments.

The AV subject pair generator (210) is responsible to link the visual subjects to the acoustic signal subjects. The AV subject pair generator (210) uses the pre-linked audio-visual information to link the incoming acoustic and the visual subjects. The AV subject pair generator (210) uses corresponding subject characteristics such as Speaker Embeddings, Gender, Type, etc. to disambiguate similar acoustic subjects. The AV subject pair generator (210) uses the deep learning technique/machine learning technique/generative model technique which is pre-trained on several audio-visual subjects to generate the relation. In an example (from FIG. 3), the table 3 is the AV subject pair generation is obtained from the table 1 (audio source separation) and table 2 (visual subject extraction).

TABLE 1

Audio source separation

| Subject | Type | Gender | Speaker Embeddings | Acoustic Activity |
|---|---|---|---|---|
| Speech 1 | Human | Female | Nikita Voice Embedding | Speaking |
| Speech 2 | Human | Female | Emanuella Voice Embedding | Chewing |

TABLE 1-continued

| Audio source separation | | | | |
|---|---|---|---|---|
| Subject | Type | Gender | Speaker Embeddings | Acoustic Activity |
| Barking | Dog | | | Barking |
| Water Gush | Sea | | | Calm |
| Wind | Beach | | | Breezy |

TABLE 2

| Visual subject extraction | | | | |
|---|---|---|---|---|
| Subject | Type | Gender | Name | Activity |
| Person | Human | Female | Nikita | Smiling & Speaking |
| Person | Human | Female | Emanuella | Eating |
| Dog | Animal | | Sam | Barking |
| Beach | Sea | | Dead Sea | Calm |

TABLE 3

| AV subject pair generation | | | | | |
|---|---|---|---|---|---|
| Subject | Type | Gender | Name | Acoustic Subject | Activity |
| Person | Human | Female | Nikita | Speech1 | Smiling while Speaking |
| Person | Human | Female | Emanuella | Speech2 | Speaking while Eating |
| Dog | Animal | | Sam | Barking | Barking |
| Beach | Sea | | Dead Sea | Water Gush | Calm |
| Beach | Sea | | Dead Sea | Wind | Breezy |

Figure 4:
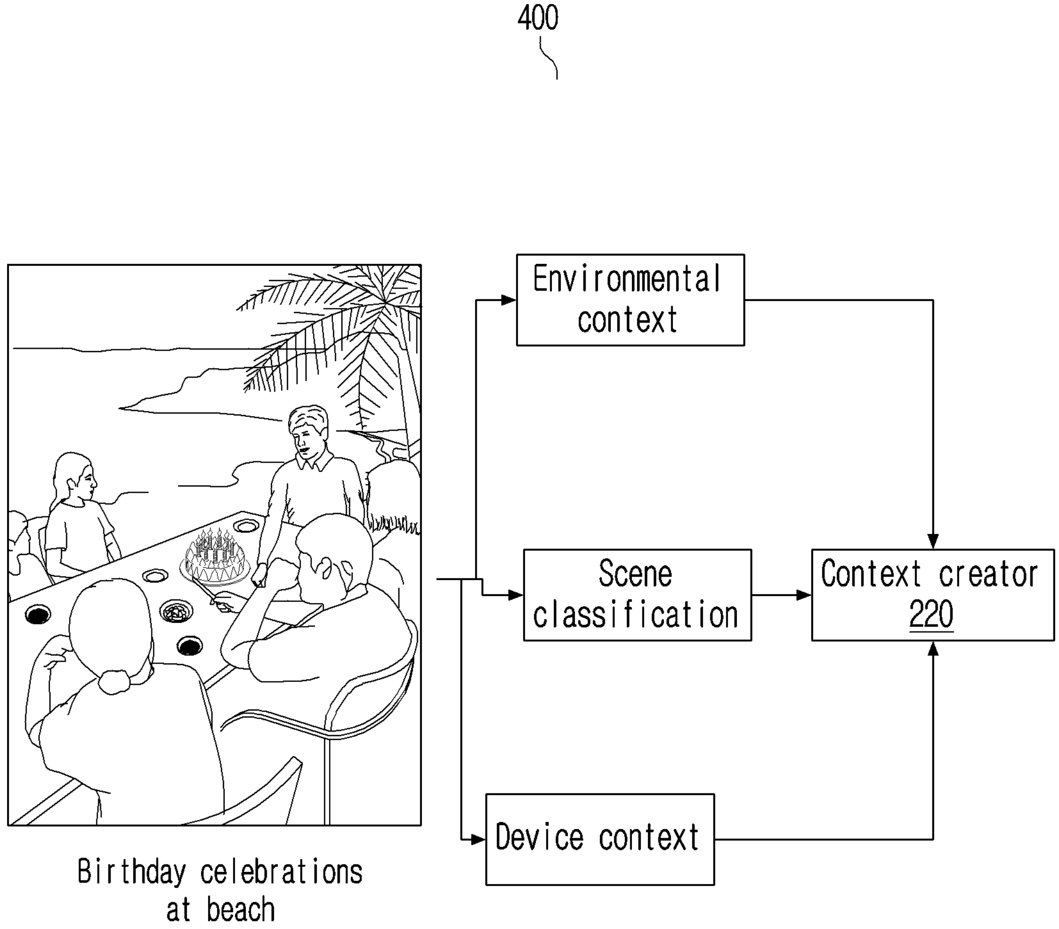
FIG. 4 is a diagram illustrating an example scenario in which operations of a context creator included in the sound source controller is explained, according to various embodiments.

FIG. 4 is a diagram illustrating an example scenario (400) in which operations of the context creator (220) included in the sound source controller (140) is explained, according to various embodiments.

The context creator (220) creates a knowledge graph dynamically from the sequence of audio visual frames. The context creator (220) correlates the audio-visual subjects to the target scene. The context creator (220) uses the pre-trained DL technique/ML technique/generative model technique with information to associate the AV subjects to the scene. The context creator (220) assigns each of the subjects in the AV frame to one or more of the detected scene. The device context is responsible to determine the usage context of the solution on the target device. In an example (from FIG. 4), the table 7 is output of the context creator obtained from the table 4 (e.g., environmental context), the table 5 (e.g., scene classification) and the table 6 (e.g., device context).

TABLE 4

| Environmental context | |
|---|---|
| Subject | Type |
| Beach | Dead Sea |
| Weather | Sunny |
| Boat | Red |

TABLE 5

| Scene classification | |
|---|---|
| Subject | Type |
| Scene | Birthday Celebrations |

TABLE 6

| Device context | |
|---|---|
| Subject | Type |
| Channels | 5.1, Stereo, Mono |
| GPU | Available |
| App | WhatsApp |
| Conversation | Sharing video |

TABLE 7

| Context creator | | | | | |
|---|---|---|---|---|---|
| Subject | Type | Gender | Name | Acoustic Subject | Scene |
| Person | Human | Female | Nikita | Speech1 | Birthday |
| Person | Human | Female | Emanuella | Speech2 | Birthday |
| Dog | Animal | | | Barking | Birthday, General |
| Beach | Sea | | Dead Sea | Water Gush | General |
| Beach | Sea | | Dead Sea | Wind | General |
| Boat | Commercial | | Titapic | Boat Horn | General |

Figure 5:
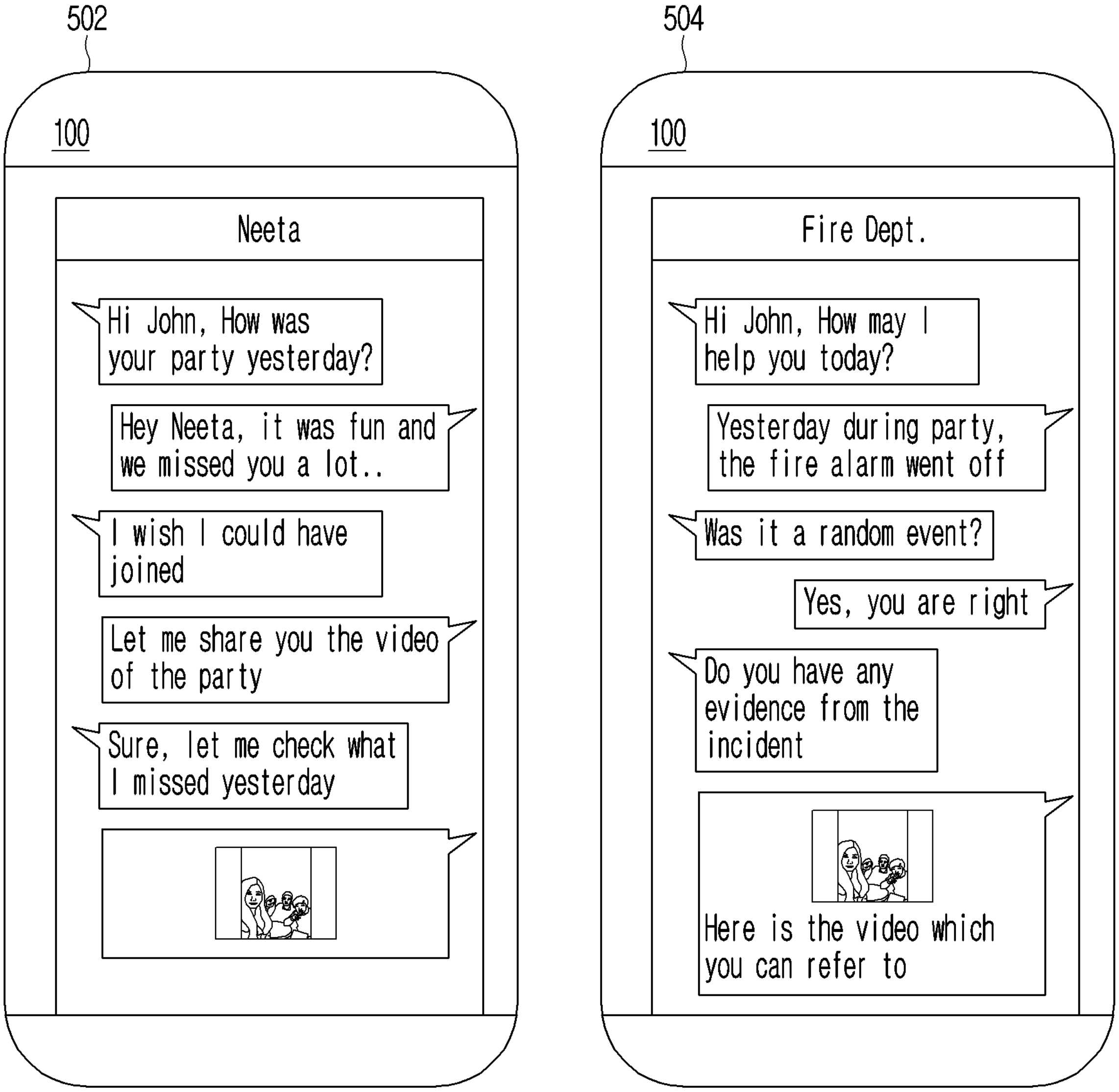
FIG. 5 is a diagram illustrating an example scenario in which operations of a device context generation is explained, according to various embodiments.

FIG. 5 is a diagram illustrating an example scenario in which operations of the device context generation is explained, according to various embodiments. The device context can not only gather context information from messenger application, but also from the voice call, the video call, the media sharing application, etc. For example, in two conversation (shown in FIG. 5), the intent is to preserve different sound sources as part of different sharing process. At 502, the John sharing his happy moments with Neeta and at 504, John sharing video segment with Fire department. which contained the fire alarm sound as an evidence

TABLE 8

| Device context | |
|---|---|
| Subject | Type |
| Channels | 5.1, Stereo, Mono |
| GPU | Available |
| App | WhatsApp |
| Conversation | Sharing video |
| Conversation | Birthday Celebration/Fire-alarm |
| Context | Malfunction |

Figure 6:
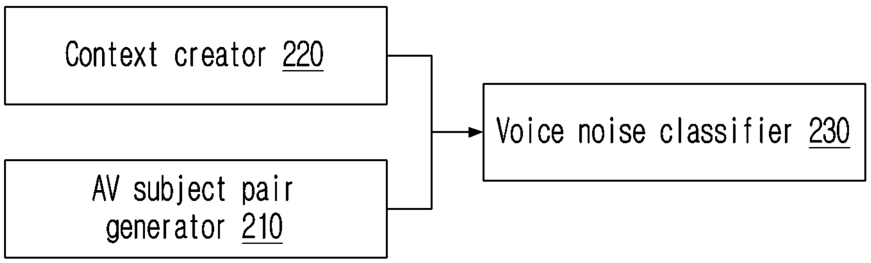
FIG. 6 is a diagram illustrating an example in which operations of a voice noise classifier included in the sound source controller is explained, according to various embodiments.

FIG. 6 is a diagram illustrating an example scenario (600) in which operations of the voice noise classifier (230) included in the sound source controller (140) are explained, according to various embodiments. The voice noise classifier (230) categorizes the acoustic subject to be either voice or noise in specific context. Using the voice noise classifier (230), the voice may refer, for example, to sound sources which needs to be retained and noise may refer, for example, to sound sources which will be partially or completely eliminated. The voice noise classifier (230) takes the information from the context creator (220) and the AV subject pair generator (210) and generates the classification labels. In an example, the table 9 is an output for the voice noise classifier (230).

TABLE 9

| Voice noise classifier | | | | | | |
|---|---|---|---|---|---|---|
| Subject | Type | Gender | Name | Acoustic Subject | Scene | Voice noise classifier |
| Person | Human | Female | Nikita | Speech1 | Birthday | Primary |
| Person | Human | Female | Emanuella | Speech2 | Birthday | Secondary |
| Dog | Animal | | | Barking | Birthday, General | Irrelevant |
| Beach | Sea | | Dead Sea | Water Gush | General | Non-Subject |
| Beach | Sea | | Dead Sea | Wind | General | Non-Subject |
| Boat | Commercial | | Titapic | Boat Horn | General | Irrelevant |

Figure 7:
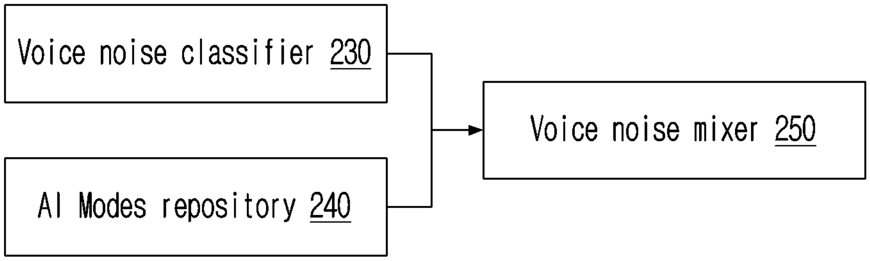
FIG. 7 is a diagram illustrating an example in which operations of the voice noise mixer included in the sound source controller is explained, according to various embodiments.

FIG. 7 is a diagram illustrating an example scenario in which operations of the voice noise mixer (250) included in the sound source controller (140) is explained, according to various embodiments. The voice noise mixer (250) is responsible to take in one of the AI modes and alter the sound sources in audio signal proportionately. Several artificial intelligent modes such as speech enhancement, vlog, visual AI, Music AI, etc which are capable to alter the proportion of sound sources automatically. Several Artificial Intelligent modes dictates how the various sound sources will be altered based on the context. The voice noise mixer (250) takes in the VN classifier (230) results and generates the mixing proportion as shown in the table 10 below.

TABLE 10

| Voice noise mixer | | | | | | | |
|---|---|---|---|---|---|---|---|
| Subject | Type | Gender | Name | Acoustic Subject | Scene | VN Classifier | VN Mixer |
| Person | Human | Female | Nikita | Speech1 | Birthday | Primary | 90% |
| Person | Human | Female | Emanuella | Speech2 | Birthday | Secondary | 90% |
| Dog | Animal | | | Barking | Birthday, General | Irrelevant | 0% |
| Beach | Sea | | Dead Sea | Water Gush | General | Non-Subject | 10% |
| Beach | Sea | | Dead Sea | Wind | General | Non-Subject | 10% |
| Boat | Commercial | | Titapic | Boat Horn | General | Irrelevant | 0% |

Figure 8:
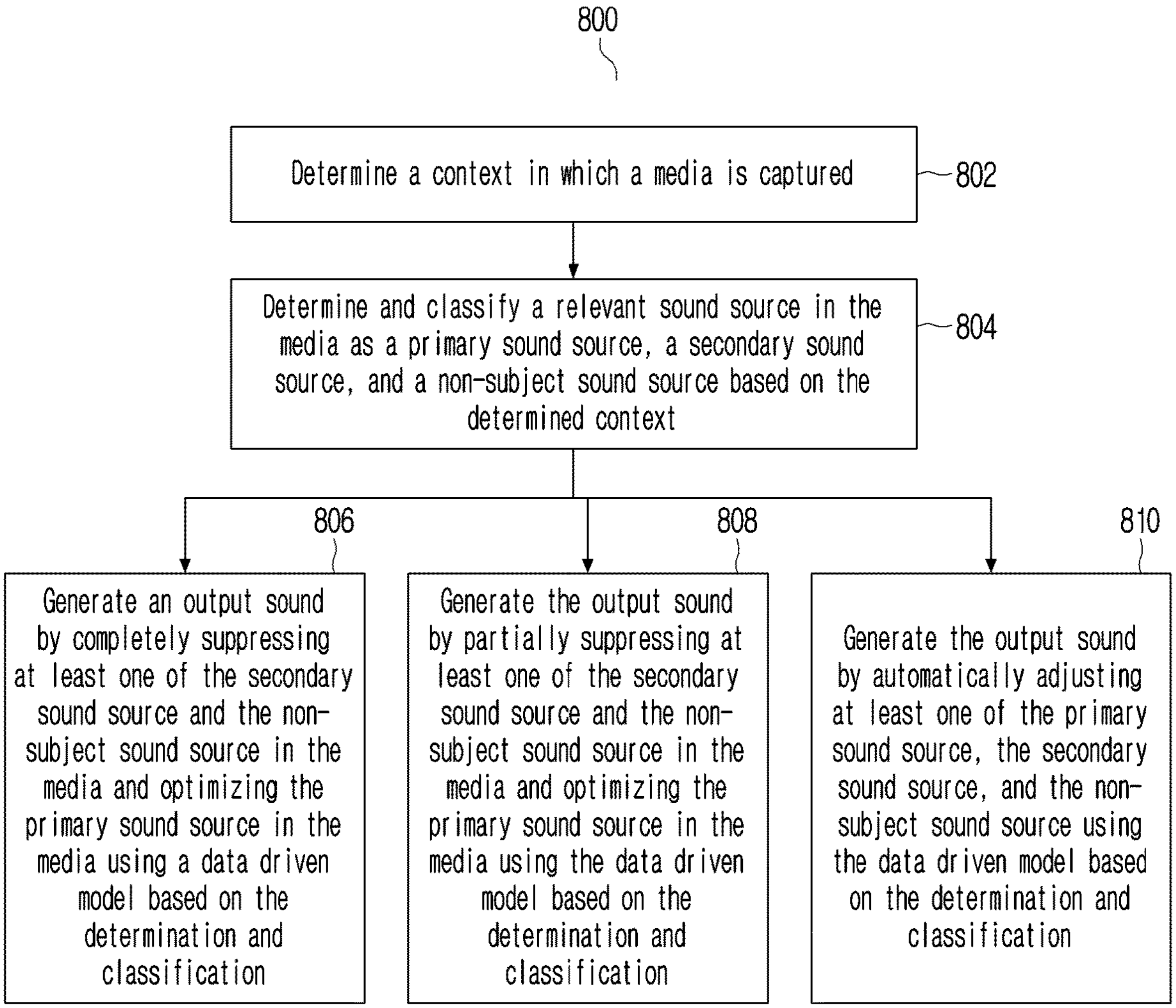
FIG. 8 and FIG. 9 are flowcharts illustrating an example method for handling a sound source in a media, according to various embodiments.
Figure 9:
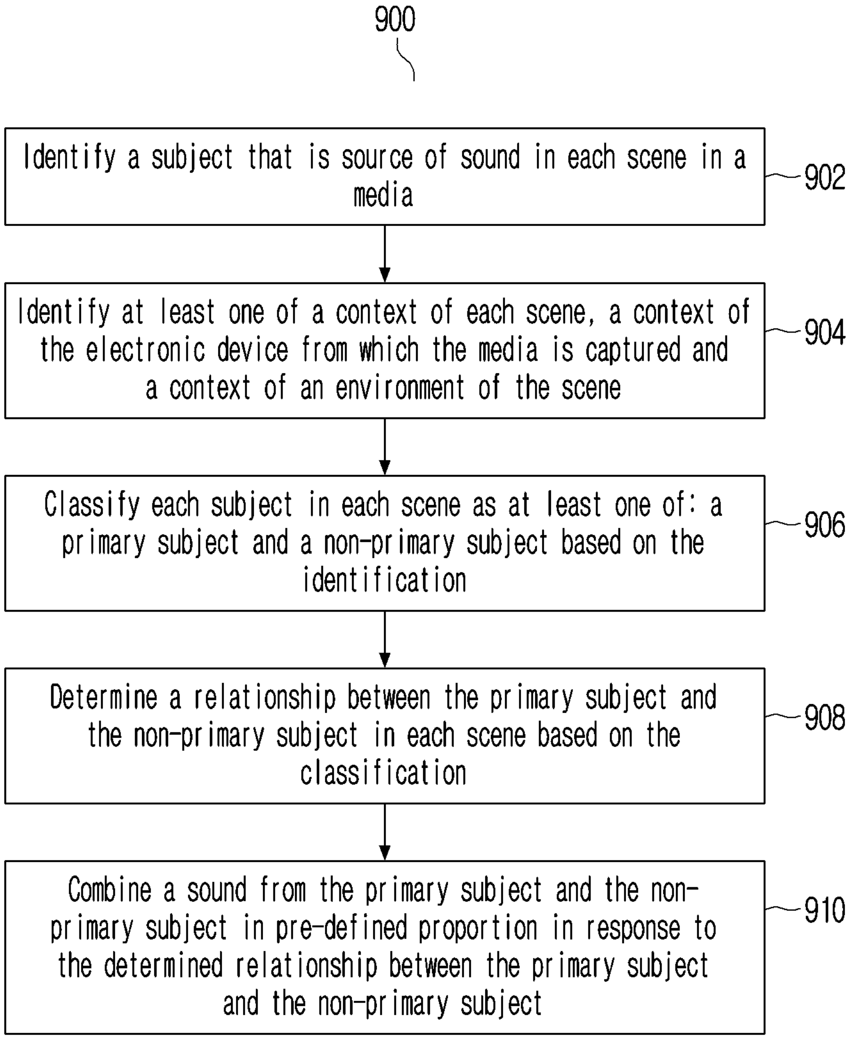
Figure 10A:
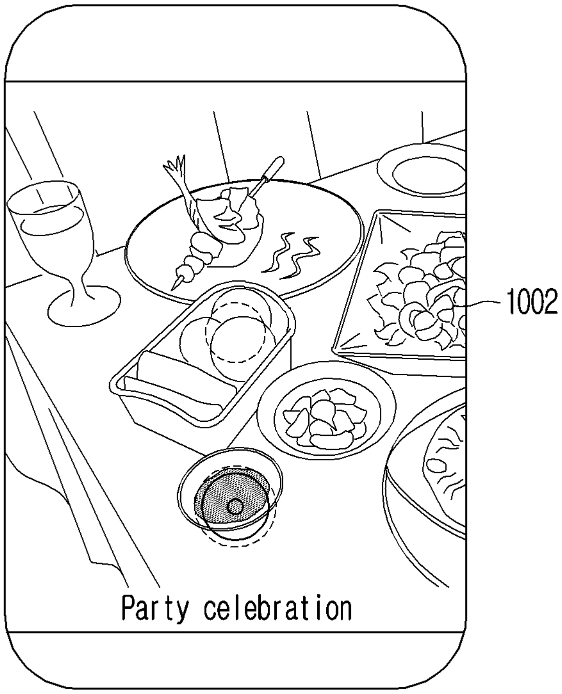
FIGS. 10A, 10B, 10C, 10D, 11A and FIG. 11B are diagrams illustrating example scenarios, wherein contextual sound source control is being performed on a video, according to various embodiments.
Figure 10B:
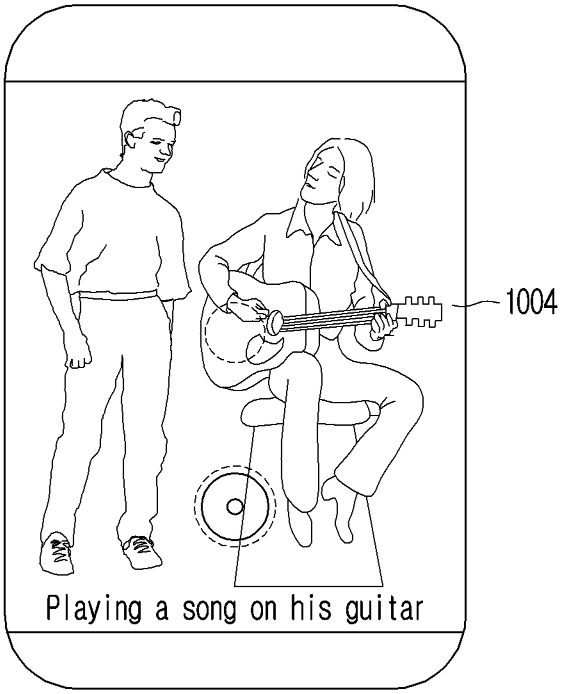
Figure 10C:
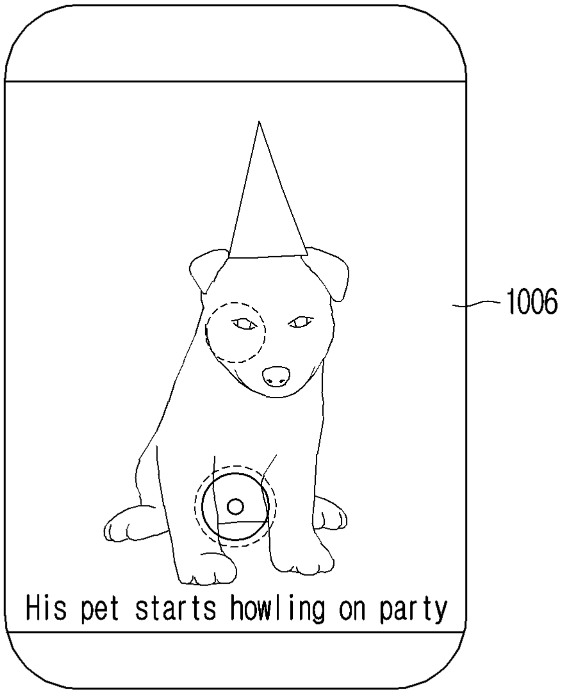
Figure 10D:
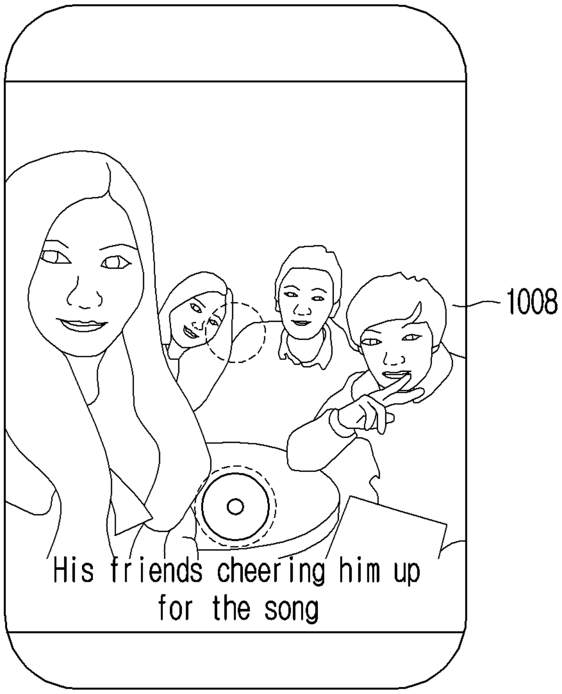

FIG. 8 and FIG. 9 are flowcharts (800 and 900) illustrating an example method for handling the sound source in the media, according to various embodiments.

As shown in FIG. 8, the operations (802-810) are handled by the sound source controller (140). At 802, the method includes determining the context in which the media is captured. At 804, the method includes determining and classifying the relevant sound source in the media as the primary sound source, the secondary sound source, and the non-subject sound source based on the determined context. In an embodiment, at 806, the method includes generating the output sound by suppressing at least one of the secondary sound source and the non-subject sound source in the media and optimizing the primary sound source in the media using the data driven model based on the determination and classification. In an embodiment, at 808, the method includes generating the output sound by partially suppressing at least one of the secondary sound source and the non-subject sound source in the media and optimizing the primary sound source in the media using the data driven model based on the determination and classification. In an embodiment, at 810, the method includes generating the output sound by automatically adjusting at least one of the primary sound source, the secondary sound source, and the non-subject sound source using the data driven model based on the determination and classification.

As shown in FIG. 9, the operations (902-910) are handled by the sound source controller (140). At 902, the method includes identifying at least one subject that is source of sound in each scene in the media. At 904, the method includes identifying at least one of the context of each scene, the context of the electronic device (100) from which the media is captured and the context of the environment of the scene. At 906, the method includes classifying each subject in each scene as at least one of: a primary subject and at least one non-primary subject based on the identification. At 908, the method includes determining a relationship between the primary subject and the at least one non-primary subject in each scene based on the classification. At 910, the method includes combining a sound from the primary subject and the non-primary subject in pre-defined proportion in response to the determined relationship between the primary subject and the at least one non-primary subject.

The disclosed method can be used to determine the sound sources present in the audio signal. The disclosed method can be used to classify the sound sources to be relevant, or irrelevant based on the visual scene and environmental context and completely eliminate irrelevant sound sources. The disclosed method can be used to classify the relevant sound sources to be primary, secondary, or non-subject sound sources. The disclosed method can be used to partially or completely suppress the non-subject noises with relevance to the context. The disclosed method can be used to dynamically host several AI based odes for contextual and intelligent handling. Thus, the disclosed method can be used to contextually suppress the acoustic sound sources in the audio signals, so as to improve the user experience. The disclosed method can be used to mixes the noise content at different levels intelligently to retain the naturalness of the video while minimizing or reducing user effort or simplifying the recording/editing time for the user.

FIGS. 10A, 10B, 10C, 10D, 11A and FIG. 11B are diagrams illustrating example scenarios (1000 and 1100), wherein contextual sound source control is being performed on the video, according to various embodiments. Consider that the user has thrown a house party for his close friends. In his party, there are many things happening around such as background music, barking dogs, guests clapping, laughing, giggling, etc. The user navigates through the party to make a video recording of his friends and pets. Embodiments herein can help in prioritizing the sound sources based on the visual focus context.

At 1002, consider that John has just landed a job in a great company and is throwing a house party. He wanted to take videos of the party and share the videos on the social media (e.g., Facebook®, Instagram® or the like). He starts capturing video of the party. Table 11 is an example table depicting the various sound sources at this instance, their respective classifications (as performed by the VN classifier (230)) and their respective determined relevance (a weightage (in terms of percentage), as determined by the VN mixer (250)).

TABLE 11

| Sound Sources | VN Classifier | VN Mixer | Mic-Geo Pos |
|---|---|---|---|
| Background Music | Primary | 80% | 2 - Ambient |
| Dog Howling | Irrelevant | 0% | |
| Guitar | Secondary | 10% | |
| Speech | Non-Subject | 5% | |
| Human Clap & Laugh | Non-Subject | 5% | |

At 1004, John then focusses the camera on his friend, who is playing a song on a guitar, as his friends cheer him on. Table 12 is an example table depicting the various sound sources at this instance, their respective classifications (as performed by the VN classifier (230)) and their respective determined relevance (a weightage (in terms of percentage), as determined by the VN mixer (250)).

TABLE 12

| Sound Sources | VN Classifier | VN Mixer | Mic-Geo Pos |
|---|---|---|---|
| Background Music | Non-Subject | 0% | |
| Dog Howling | Irrelevant | 0% | |
| Guitar | Primary | 90% | 1, 2 - Front |
| Speech | Non-Subject | 5% | |
| Human Clap & Laugh | Non-Subject | 5% | |

At 1006, then, his pet starts howling to the tune being played by his friend, so, John turns to focus the camera on the dog. Table 13 is an example table depicting the various sound sources at this instance, their respective classifications (as performed by the VN classifier (230)) and their respective determined relevance (a weightage (in terms of percentage), as determined by the VN mixer (250)).

TABLE 13

| Sound Sources | VN Classifier | VN Mixer | Mic-Geo Pos |
|---|---|---|---|
| Background Music | Non-Subject | 20% | |
| Dog Howling | Primary | 70% | 1, 2 - Front |
| Guitar | Irrelevant | 0% | |
| Speech | Non-Subject | 10% | |
| Human Clap & Laugh | Non-Subject | 10% | |

At 10008, as his friend finishes the song, John moves his camera around the room to show his friends clapping and cheering. Table 14 is an example table depicting the various sound sources at this instance, their respective classifications (as performed by the VN classifier (230)) and their respective determined relevance (a weightage (in terms of percentage), as determined by the VN mixer (250)).

TABLE 14

| Sound Sources | VN Classifier | VN Mixer | Mic-Geo Pos |
|---|---|---|---|
| Background Music | Non-Subject | 40% | |
| Dog Howling | Irrelevant | 0% | |
| Guitar | Irrelevant | 0% | |
| Speech | Primary | 90% | 1 - Left |
| Human Clap & Laugh | Secondary | 90% | |

Figure 11A:
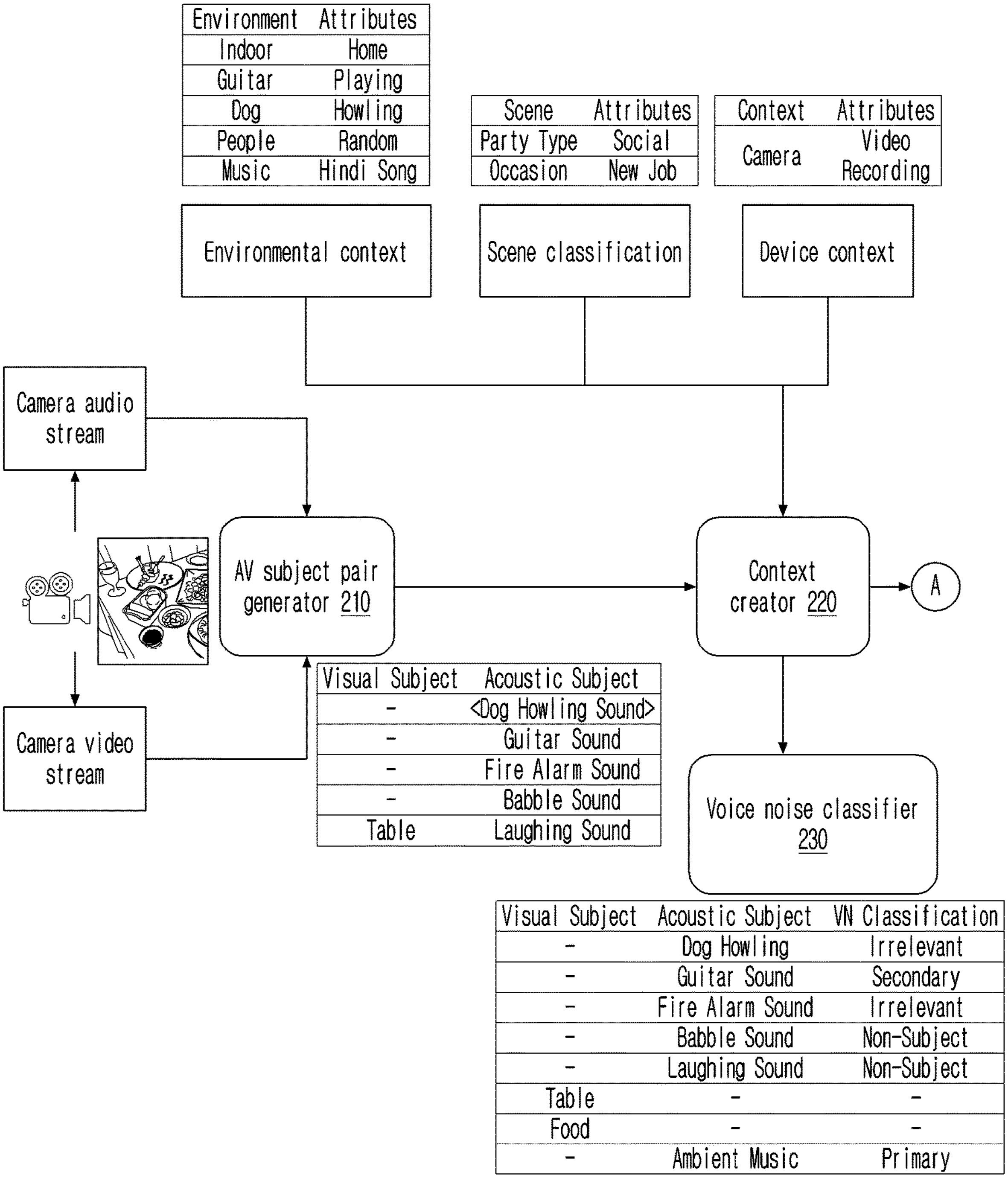
Figure 11B:
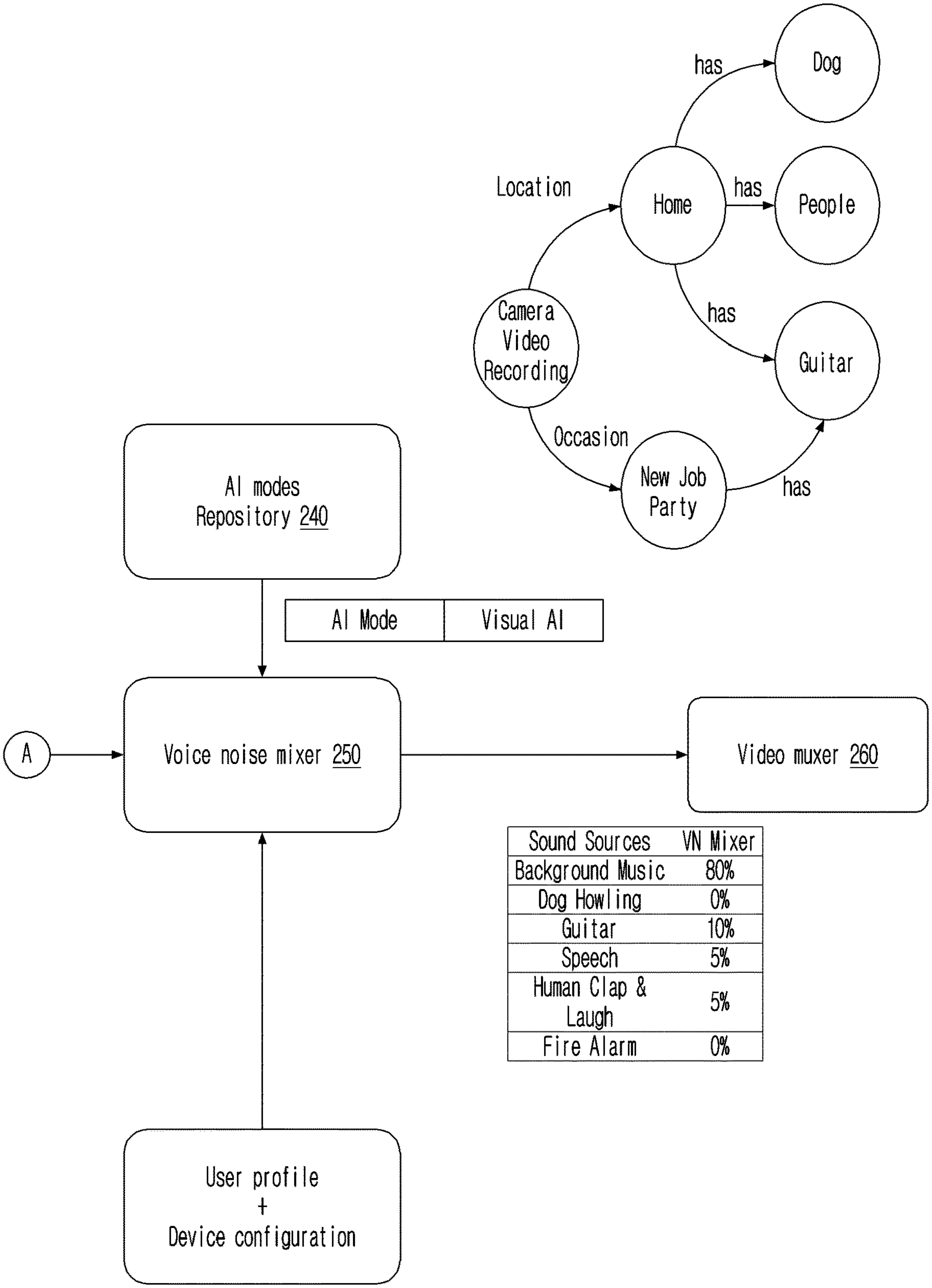
Figure 12A:
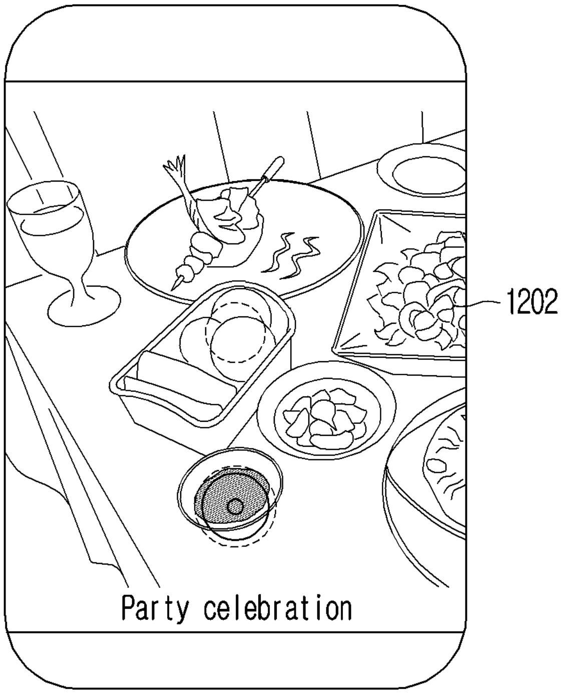
FIGS. 12A, 12B, 12C and FIG. 12D are diagrams illustrating example scenarios, wherein contextual sound source control is being performed on a video, according to various embodiments.
Figure 12B:
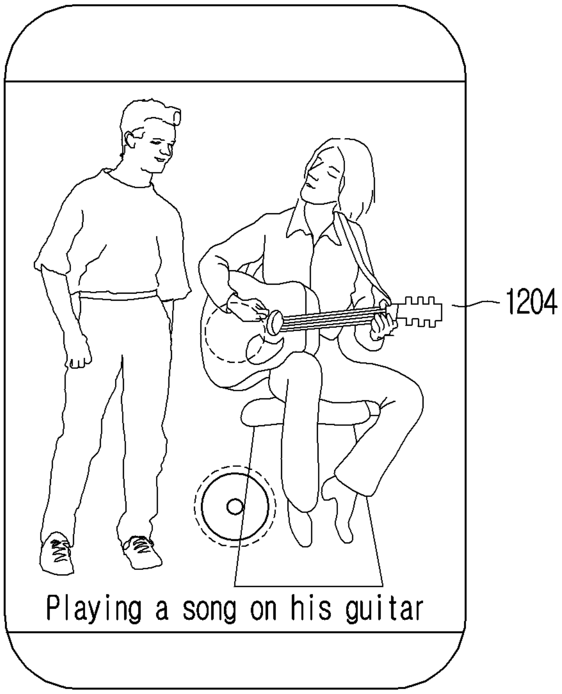
Figure 12C:
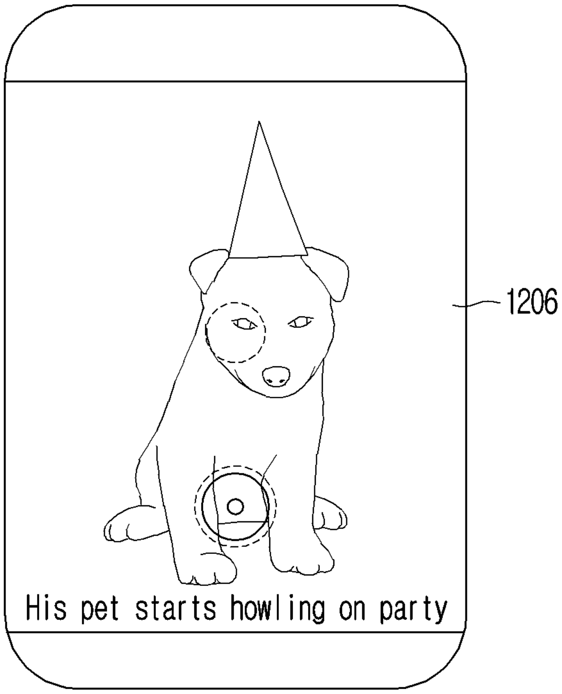
Figure 12D:
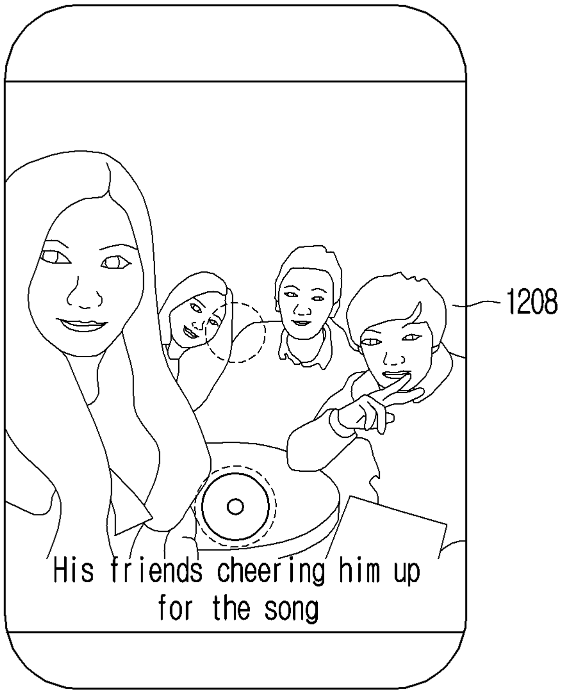
Figure 13A:
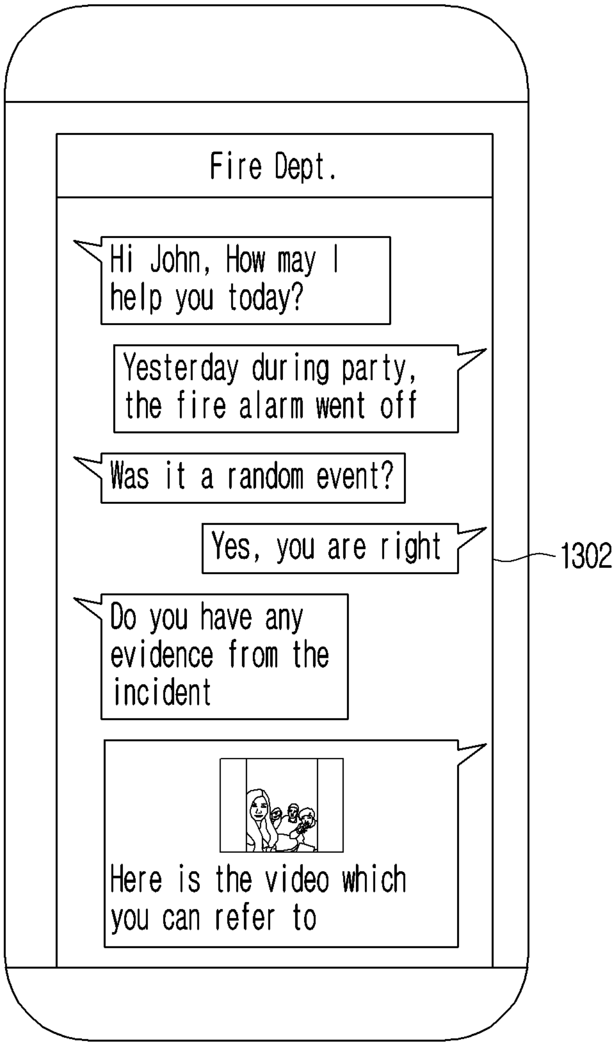
FIGS. 13A, 13B, 13C, 13D and FIG. 13E are diagrams illustrating example scenarios, wherein contextual sound source control is being performed on a video, according to various embodiments.
Figure 13B:
Figure 13C:
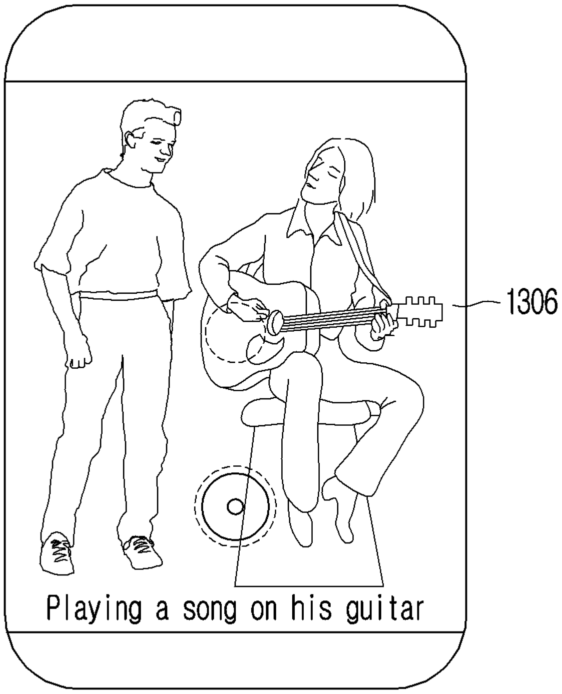
Figure 13D:
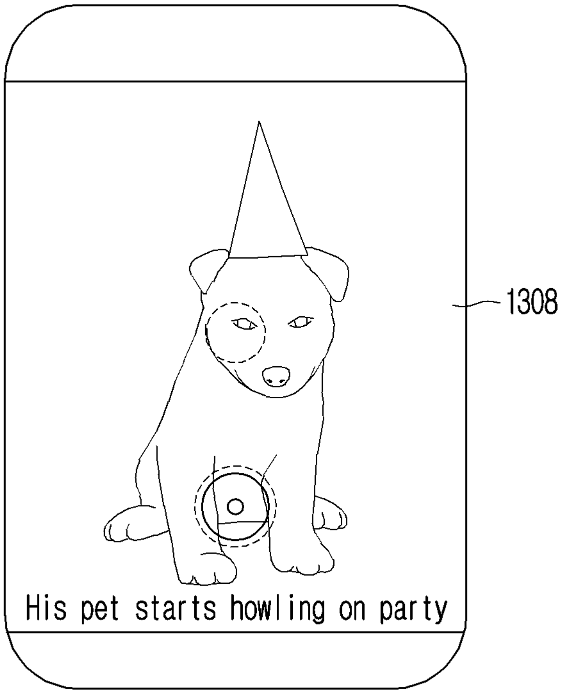
Figure 13E:
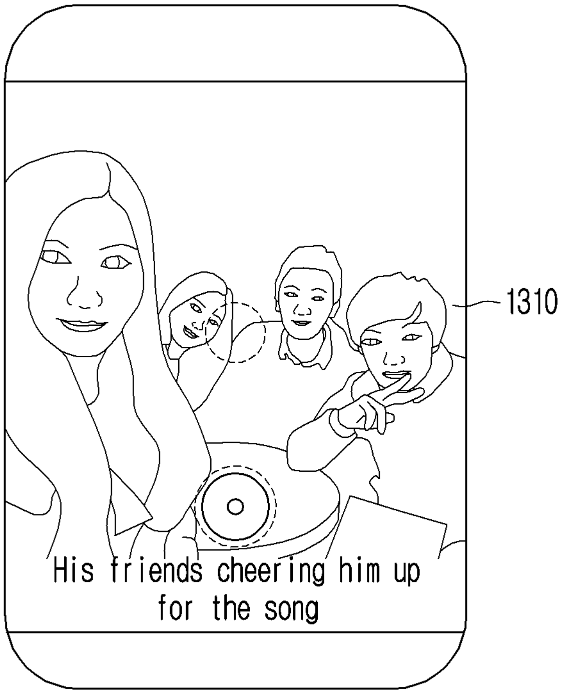

FIG. 11A and FIG. 11B are diagrams illustrating examples of corresponding data flow (1100) of FIGS. 10A to 10D, wherein the AV subject pair generator (210) determines the visual subjects present in the video. Table 15 depicts the determined visual subjects for the current example (depicted in FIG. 11A and FIG. 11B).

TABLE 15

| Visual Subject | Acoustic Subject |
|---|---|
| — | <Dog Howling Sound> |
| — | Guitar Sound |
| — | Fire Alarm Sound |
| — | Babble Sound |
| — | Laughing Sound |
| Table | — |
| Food | — |
| — | Ambient Music |

The context creator (220) can receive the environmental context (as depicted in table 16), the scene classification (as depicted in table 17), and device context (as depicted in table 18), using which the context creator (220) can generate the context.

TABLE 16

| Environment | Attributes |
|---|---|
| Indoor | Home |
| Guitar | Playing |
| Dog | Howling |
| People | Random |
| Music | Hindi Song |

TABLE 17

| Scene | Attributes |
|---|---|
| Party Type | Social |
| Occasion | New Job |

TABLE 18

| Context | Attributes |
|---|---|
| Camera | Video Recording |

Based on the context, the VN classifier (230) can classify the visual and acoustic subjects as the primary subjects, the secondary subjects, the non-subject subjects, or the irrelevant subjects, in the current scenario. Table 19 depicts an example classification.

TABLE 19

| Visual Subject | Acoustic Subject | VN Classification |
|---|---|---|
| — | Dog Howling | Irrelevant |
| — | Guitar Sound | Secondary |
| — | Fire Alarm Sound | Irrelevant |
| — | Babble Sound | Non-Subject |
| — | Laughing Sound | Non-Subject |
| Table | — | — |
| Food | — | — |
| — | Ambient Music | Primary |

Based on the classification and the relevant AI mode (e.g., visual AI mode or the like), the VN mixer (250) proportionately mixes the voice and noise sound sources, which is then provided to the video multiplexer (muxer (260)). Table 20 depicts an example scenario.

TABLE 20

| Sound Sources | VN Mixer |
|---|---|
| Background Music | 80% |
| Dog Howling | 0% |
| Guitar | 10% |
| Speech | 5% |
| Human Clap & Laugh | 5% |
| Fire Alarm | 0% |

FIGS. 12A, 12B, 12C and 12D are diagrams illustrating example scenarios (1200), wherein contextual sound source control is being performed on the video, according to various embodiments. FIGS. 13A, 13B, 13C, 13D and 13E are diagrams illustrating example scenarios (1300), wherein contextual sound source control is being performed on the video, according to various embodiments.

The operations 1202-1208 and 1304 to 1310 are similar to steps 1002-1008. For the sake of brevity, we the repeated is not repeated here.

Consider that the user (e.g., John) has thrown the house party for his close friends. In his party, there are many things happening around such as background music, barking dogs, guests clapping, laughing, giggling, etc. The user navigates through the party to make the video recording of his friends and pets. Embodiments herein can help in prioritizing the sound sources based on the visual focus context.

Consider that John has just landed the job in the great company and is throwing a house party. He wanted to take videos of the party and share the videos on the social media. He starts capturing video of the party. While recording, the house fire alarm gets turned on momentarily due to a malfunction, and the noise of the fire alarm gets recorded in the video. The user shares the video with his friends sharing the details of the party, with the noise of the fire alarm being considered irrelevant and hence suppressed in this video (as depicted in FIG. 12A to FIG. 12D (hereafter FIG. 12)). Thereafter, the user shares the video to the fire department executive/service person as evidence of the malfunctioning fire alarm noise, with the noise of the party being considered irrelevant and hence suppressed in this video (as depicted in FIG. 13A to FIG. 13E (hereafter FIG. 13)).

As depicted in FIG. 12, table 21 is an example table depicting the various sound sources at the instance (when John has started recording video), their respective classifications (as performed by the VN classifier (230)) and their respective determined relevance (a weightage (in terms of percentage), as determined by the VN mixer (250)).

TABLE 21

| Sound Sources | VN Classifier | VN Mixer |
|---|---|---|
| Background Music | Primary | 80% |
| Dog Howling | Irrelevant | 0% |
| Guitar | Secondary | 10% |
| Speech | Non-Subject | 5% |
| Human Clap & Laugh | Non-Subject | 5% |
| Fire Alarm | Irrelevant | 0% |

John then focusses the camera on his friend, who is playing a song on the guitar, as his friends cheer him on. Table 22 is an example table depicting the various sound sources at this instance, their respective classifications (as performed by the VN classifier (230)) and their respective determined relevance (a weightage (in terms of percentage), as determined by the VN mixer (250)).

TABLE 22

| Sound Sources | VN Classifier | VN Mixer |
|---|---|---|
| Background Music | Non-Subject | 0% |
| Dog Howling | Irrelevant | 0% |
| Guitar | Primary | 90% |
| Speech | Non-Subject | 5% |
| Human Clap & Laugh | Non-Subject | 5% |
| Fire Alarm | Irrelevant | 0% |

Then, his pet starts howling to the tune being played by his friend; so, John turns to focus the camera on the dog. Table 23 is an example table depicting the various sound sources at this instance, their respective classifications (as performed by the VN classifier (230)) and their respective determined relevance (a weightage (in terms of percentage), as determined by the VN mixer (250)).

TABLE 23

| Sound Sources | VN Classifier | VN Mixer |
|---|---|---|
| Background Music | Non-Subject | 20% |
| Dog Howling | Primary | 70% |
| Guitar | Irrelevant | 0% |
| Speech | Non-Subject | 10% |
| Human Clap & Laugh | Non-Subject | 10% |
| Fire Alarm | Irrelevant | 0% |

The fire alarm get turned on momentarily at this point in time. As his friend finishes the song, John moves his camera around the room to show his friends clapping and cheering. Table 24 is an example table depicting the various sound sources at this instance, their respective classifications (as performed by the VN classifier (230)) and their respective determined relevance (a weightage (in terms of percentage), as determined by the VN mixer (250)), for the video that John is going to share with his friends of the party.

TABLE 24

| Sound Sources | VN Classifier | VN Mixer |
|---|---|---|
| Background Music | Non-Subject | 40% |
| Dog Howling | Irrelevant | 0% |
| Guitar | Irrelevant | 0% |

TABLE 24-continued

| Sound Sources | VN Classifier | VN Mixer |
|---|---|---|
| Speech | Primary | 90% |
| Human Clap & Laugh | Secondary | 90% |
| Fire Alarm | Irrelevant | 0% |

John shares the video segment with the fire department or a maintenance person, which contains the sound of the fire alarm as an evidence of the malfunctioning fire alarm, wherein this video segment has only the sound of the fire alarm and the sound of the party is suppressed in this video segment (as depicted in FIG. 13). Table 25 is an example table depicting the various sound sources at this instance, their respective classifications (as performed by the VN classifier (230)) and their respective determined relevance (a weightage (in terms of percentage), as determined by the VN mixer (250)).

TABLE 25

| Sound Sources | VN Classifier | VN Mixer |
|---|---|---|
| Background Music | Irrelevant | 0% |
| Dog Howling | Irrelevant | 0% |
| Guitar | Irrelevant | 0% |
| Speech | Irrelevant | 0% |
| Human Clap & Laugh | Irrelevant | 0% |
| Fire Alarm | Primary | 100% |

Figure 14:
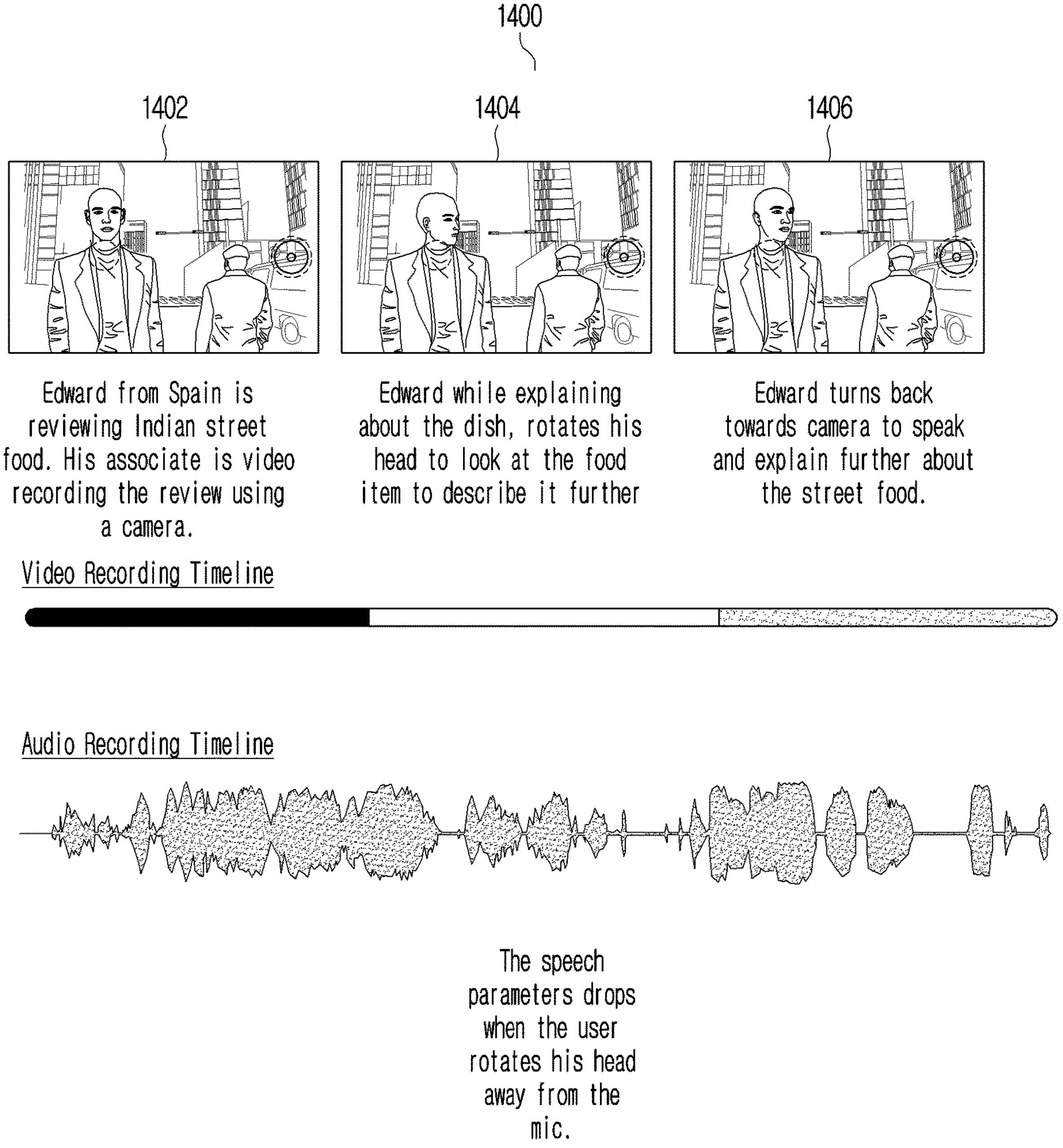
FIG. 14 is a diagram illustrating an example scenario in which speech clarity is improved based on subject orientation, according to various embodiments.

FIG. 14 is a diagram illustrating an example scenario (1400) in which speech clarity is improved based on the subject orientation, according to various embodiments. Consider an example, the user (e.g., Edward) is reviewing Indian street food. The user speaks out spontaneously by randomly viewing the camera and the food item being prepared. The background noise is almost constant, whereas the users voice diminishes based on his head orientation.

At 1402, Edward from Spain is reviewing Indian street food. His associate is video recording the review using the camera. At 1404, Edward while explaining about the dish, rotates his head to look at the food item to describe it further. The speech parameters drops when the user rotates his head away from the mic. The same is indicated in the table. At 1406, Edward turns back towards camera to speak and explain further about the street food.

Embodiments herein are explained with respect to scenarios, wherein the user is capturing video or recorded videos. However, it may be apparent to a person of ordinary skill in the art that embodiments herein may be applicable to any scenario, wherein sound is being captured; such as, but not limited to, a sound recording, a call recording, and so on.

The various actions, acts, blocks, steps, or the like in the flow charts (800 and 900) may be performed in the order presented, in a different order or simultaneously. Further, in various embodiments, some of the actions, acts, blocks, steps, or the like may be omitted, added, modified, skipped, or the like without departing from the scope of the disclosure.

The embodiments disclosed herein can be implemented through at least one software program running on at least one hardware device and performing network management functions to control the elements. The elements can be at least one of a hardware device, or a combination of hardware device and software module.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for handling a sound source in a media, comprising:

determining, by an electronic device, a context in which the media is captured;

determining and classifying, by the electronic device, a relevant sound source in the media as a primary sound source, a secondary sound source, and a non-subject sound source based on the determined context; and performing, by the electronic device, at least one of:

generating an output sound by suppressing at least one of the secondary sound source and the non-subject sound source in the media and optimizing the primary sound source in the media using a data driven model based on the determination and classification, generating the output sound by partially suppressing at least one of the secondary sound source and the non-subject sound source in the media and optimizing the primary sound source in the media using the data driven model based on the determination and classification, and generating the output sound by automatically adjusting at least one of the primary sound source, the secondary sound source, and the non-subject sound source using the data driven model based on the determination and classification.

2. The method as claimed in claim 1, wherein the method comprises:

detecting, by the electronic device, at least one event, wherein the at least one event comprises at least one of: a change in a sound source parameter associated the media, a change in correlation between a visual subject associated with the media in focus to the sound source occurring at a specified interval, a change in correlation between the primary sound source and the secondary sound source in the media at a specified interval, a change in an orientation and movement of a subject in a visual scene and position of a recording media associated with the media;

determining, by the electronic device, the context of the media based on the at least one detected event;

determining, by the electronic device, a second relevant sound source in the media as a second primary sound source, a second secondary sound source, and a second non-subject sound source based on the determined context; and performing, by the electronic device, at least one of:

generating a second output sound by completely suppressing at least one of the second secondary sound source and the second non-subject sound source in the media and optimizing the second primary sound source in the media using the data driven model based on the determination and classification, generating the second output sound by partially suppressing at least one of the second secondary sound source and the second non-subject sound source in the media and optimizing the second primary sound source in the media using the data driven model based on the determination and classification, and generating the second output sound by automatically adjusting at least one of the second primary sound source, the second secondary sound source, and the second non-subject sound source using the data driven model based on the determination and classification.

3. The method as claimed in claim 1, wherein completely suppressing at least one of the secondary sound source and the non-subject sound source in the media comprises:

determining a correlation between the primary sound source and at least one of the secondary sound source and the non-subject sound source; and completely suppressing at least one of the secondary sound source and the non-subject sound source in the media based on the determined correlation.

4. The method as claimed in claim 1, wherein completely suppressing at least one of the secondary sound source and the non-subject sound source in the media comprises:

identifying at least one of the secondary sound source and the non-subject sound source in the media as an irrelevant sound source; and completely suppressing the least one of the secondary sound source and the non-subject sound source in the media based on the identification.

5. The method as claimed in claim 1, wherein the partially suppressing at least one of the secondary sound source and the non-subject sound source in the media comprises:

determining a correlation between the primary sound source and at the least one of the secondary sound source and the non-subject sound source; and partially suppressing at least one of the secondary sound source and the non-subject sound source in the media based on the determined correlation.

6. The method as claimed in claim 1, wherein the determining and categorizing, by the electronic device, the relevant sound source in the media as the primary sound source, the secondary sound source, and the non-subject sound source comprises:

obtaining, by the electronic device, at least one of an environmental context, a scene classification information, a device context, and a hearing profile; and determining, by the electronic device, the relevant sound source in the media as the primary sound source, the secondary sound source, and the non-subject sound source based on at least one of the environmental context, the scene classification information, the device context, and the hearing profile.

7. The method as claimed in claim 6, wherein the method comprises:

selectively monitoring, by the electronic device, on each relevant sound source based on the at least one of the environmental context, the scene classification information, and the device context.

8. The method as claimed in claim 1, wherein generating an output sound source by automatically adjusting at least one of the primary sound source, the secondary sound source, and the non-subject sound source using the data driven model comprises:

determining a relative orientation of a recording media and the primary sound source;

adjusting a proportion of the secondary sound source and a proportion of the non-subject sound source upon determining a relative orientation of the recording media and the primary sound source; and generating the output sound source by adjusting relative orientation of the recording media and the primary sound source, the proportion of the secondary sound source, and the proportion of the non-subject sound source.

9. A method for handling a sound source in a media, comprising:

identifying, by an electronic device, at least one subject comprising a source of sound in each scene in a media;

identifying, by the electronic device, at least one of a context of each scene, a context of the electronic device from which the media is captured and a context of an environment of a scene;

classifying, by the electronic device, each subject in each scene as at least one of: a primary subject and at least one non-primary subject based on the identification;

determining, by the electronic device, a relationship between the primary subject and the at least one non-primary subject in each scene based on the classification; and combining, by the electronic device, a sound from the primary subject and the at least one non-primary subject in specified proportion in response to the determined relationship between the primary subject and the at least one non-primary subject.

10. The method as claimed in claim 9, wherein the method comprises:

partially or completely eliminating, by the electronic device, the sound from the at least one non-primary subject upon determining the relationship between the primary subject and the at least one non-primary subject.

11. The method as claimed in claim 9, wherein the method comprises:

determining, by the electronic device, a relevancy of the at least one non-primary subject with respect to the context based on a data driven model; and partially or completely suppressing, by the electronic device, the sound from the at least one non-primary subjects based on the determination.

12. The method as claimed in claim 9, wherein the method comprises:

identifying, by the electronic device, the at least one non-primary subject as irrelevant sound source; and completely suppressing, by the electronic device, the sound from the at least one non-primary subject.

13. The method as claimed in claim 9, wherein the method comprises:

determining, by the electronic device, at least one of an orientation and a movement of the at least one subject in each scene and position of a recording media to adaptively tune the sound from the subject in the scene.

14. An electronic device, comprising:

at least one processor comprising processing circuitry;

a memory; and a sound source controller, coupled with the processor and the memory, configured to:

determine a context in which a media is captured;

determine and classify a relevant sound source in the media as a primary sound source, a secondary sound source, and a non-subject sound source based on the determined context; and perform at least one of:

generate an output sound by completely suppressing at least one of the secondary sound source and the non-subject sound source in the media and optimizing the primary sound source in the media using a data driven model based on the determination and classification, generate the output sound by partially suppressing at least one of the secondary sound source and the non-subject sound source in the media and optimizing the primary sound source in the media using the data driven model based on the determination and classification, and generate the output sound by automatically adjusting at least one of the primary sound source, the secondary sound source, and the non-subject sound source using the data driven model based on the determination and classification.

15. An electronic device, comprising:

at least one processor comprising processing circuitry;

a memory; and a sound source controller, coupled with the at least one processor and the memory, configured to:

identify at least one subject that is a source of sound in each scene in a media;

identify at least one of a context of each scene, a context of the electronic device from which the media is captured and a context of an environment of a scene;

classify each subject in each scene as at least one of: a primary subject and at least one non-primary subject based on the identification;

determine a relationship between the primary subject and the at least one non-primary subject in each scene based on the classification; and combine a sound from the primary subject and the at least one non-primary subject in specified proportion in response to the determined relationship between the primary subject and the at least one non-primary subject.

* * * * *